US008255248B1

(12) United States Patent
Del Favero et al.

(10) Patent No.: US 8,255,248 B1
(45) Date of Patent: Aug. 28, 2012

(54) METHOD AND COMPUTER PROGRAM PRODUCT FOR OBTAINING REVIEWS OF BUSINESSES FROM CUSTOMERS

(75) Inventors: James Robert Del Favero, Mountain View, CA (US); Todd Frey Goodyear, San Diego, CA (US); David Otto Madurzak, San Diego, CA (US); Jay Schirmacher, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 982 days.

(21) Appl. No.: 11/490,666

(22) Filed: Jul. 20, 2006

(51) Int. Cl.
*G06F 9/44* (2006.01)
(52) U.S. Cl. .................. 705/7.11; 705/7.29; 705/7.32
(58) Field of Classification Search .............. 705/7.11, 705/7.29, 7.32
See application file for complete search history.

(56) References Cited

U.S. PATENT DOCUMENTS

| | | | | |
|---|---|---|---|---|
| 6,064,980 | A * | 5/2000 | Jacobi et al. | 705/26.7 |
| 6,785,671 | B1 * | 8/2004 | Bailey et al. | 705/26.81 |
| 6,963,848 | B1 * | 11/2005 | Brinkerhoff | 705/7.32 |
| 7,383,200 | B1 * | 6/2008 | Walker et al. | 705/7.15 |
| 7,979,300 | B2 * | 7/2011 | Chandra | 705/7.29 |
| 8,069,075 | B2 * | 11/2011 | Santos et al. | 705/7.29 |
| 2002/0035474 | A1 * | 3/2002 | Alpdemir | 704/270 |
| 2003/0204449 | A1 * | 10/2003 | Kotas et al. | 705/27 |
| 2005/0065811 | A1 * | 3/2005 | Chu et al. | 705/1 |
| 2006/0010019 | A1 * | 1/2006 | Phillips et al. | 705/7 |
| 2006/0190475 | A1 * | 8/2006 | Shi | 707/102 |
| 2006/0247946 | A1 * | 11/2006 | Gordon | 705/1 |

OTHER PUBLICATIONS

"Introducing Marketing Students to Business Intelligence using Project-based Learning on the World Wide Web", Carolyn F. Siegel, Journal of Marketing Education V22n2; Aug. 2000.*
"Get the Latest Information on Customer Satisfaction"; M2 Presswire, Apr. 2005.*
"Intelligent Information Recommend System on the Internet", by Kim et al., IEEE, 1999, pp. 1-5.*
"What Makes a Good Reviewer and a Good Review for a General Medical Journal?", by Nick Black, MD; Susan Van Rooyen, BSc; Fiona Godless, MRCP; Richard Smith, FRCP; and Stephen Evans, MSc; The Jaruranal of the American Medical Association; vol. 208, No. 3, Jul. 15, 1998.*
"Explaining Collaborative Filtering Recommendations", by Jonathan L. Herlocker, Joseph A. Konstan, and John Riedl; Dept. of Computer Science and Engineering, University of Minnesota; CSCW'00, Dec. 2-6, 2000.*

(Continued)

*Primary Examiner* — Lynda Jasmin
*Assistant Examiner* — Pan Choy
(74) *Attorney, Agent, or Firm* — McKay and Hodgson, LLP; Philip McKay; Sean P. Lewis

(57) ABSTRACT

A method and apparatus for automatically soliciting business reviews includes a process for automatically soliciting business reviews whereby searches made, and/or reviews submitted, by individuals using a community based business listing and review system are monitored and user specific usage data is collected including: the user's identification; the business listing category in which a search was conducted and/or the business listing category in which a review was submitted by the user; and the community in which the user resides, and/or the community in which the search was made, and/or the community in which the business reviewed resides. Once user specific usage data about the user, and the searches the user conducts and/or the reviews the user has submitted, is gathered, the user specific usage data is then used to create user specific review solicitations of various types.

4 Claims, 12 Drawing Sheets

OTHER PUBLICATIONS

"Recommender Systems in E-Commerce", by J. Ben Schafer, Joseph Konstan, and John Riedl; Dept. of Computer Science and Engineering, University of Minnesota; E-Commerce, Denver, Colorado; 1999.*

"Epinions.com", by shopping.com, 2001-2005; Web site: http://epinions.com; Web Archive Way Back Machine: http://Web.Archive.org/web/20050214091531/http://www.epinions.com.*

* cited by examiner

300A

Search for    301
[                    ] Within [5 Mi] of [Any Town]  Go [ ]
   Business Type or Name              City, state or ZIP Location
[Any Town]    303

Choose a Category:

⇨ Legal Services

⇨ Automotive

⇨ Entertainment

⇨ Real Estate
                      305
⇨ Food

⇨ Fitness

⇩ Retail Stores    305A
          Appliances
          Auto Parts
          Bookstores    307
          Computer    307A
          Electronics
          Grocery
⇨ Travel

Search for 301

[_____] Within [5 Mi] of [Any Town] Go [ ]

Business Type or Name · · · · City, state or ZIP

Location
[Any Town] 303

Choose a Category:

⇨ Legal Services

⇨ Automotive

⇨ Entertainment

⇨ Real Estate 305

⇨ Food

⇨ Fitness

⬇ Retail Stores 305A

Appliances

Auto Parts

Bookstores 307

Computer 307A

Electronics

Grocery

⇨ Travel

310

1. Computer Store One
   (111) 111-1111
   1 First Street, Any Town    311
   Overall Rating ☆☆☆☆
   Inventory ☐

2. Computer Store Two
   (222) 222-2222       312
   22 Second Street, Any Town
325   Overall Rating ☆☆☆☆

3. Computer Store Three    313
   (333) 333-3333
   333 Third Street, Any Town
   Overall Rating ☆☆☆
   Inventory ☐

4. Computer Store Four     314
   (444) 444-4444
   4444 Fourth Street, Any Town
   Overall Rating ☆☆
   Inventory ☐

5. Computer Store Five     315
   (555) 555-5555
   55555 Fifth Street, Any Town
   Overall Rating ☆☆
   Inventory ☐

Computer Store Two
(222) 222-2222
22 Second Street, Any Town
Overall Rating: ☆ ☆ ☆ ☆

331
    ☆ ☆ ☆ ☆  To my mind, computer store two is the best computer store in Any Town.
      Sales People are low pressure, fair and know their stuff.  Service department top notch and fast.  Reviewer 1, Date 332
    ☆ ☆ ☆ ☆  Great Store, Great People!  What more can I say? Reviewer 2, Date

REQUEST 541
One of your neighbors in
AnyTown is searching for reviews
in the category "X" and wonders
if you have any information on a
good "X" dealer. If so, your
neighbor would be grateful if you
could take the time to submit a
review
Thank You

```
Please Indicate Receipt of this
   Alert by Clicking on the
 "RECIEVED" Box Provided Below
```

543 ☐ RECIEVED

METHOD AND COMPUTER PROGRAM PRODUCT FOR OBTAINING REVIEWS OF BUSINESSES FROM CUSTOMERS

BACKGROUND

Currently, community driven, or community based, business listing and review systems provide a review forum and recommendation service for business listings centered on a defined and/or selected geographical area such as a town or city. Currently, there exist several community based business listing and review systems. Current community based business listing and review systems typically provide listings of local businesses, as well as a review/feedback forum and/or a rating system for the businesses listed. Community based business listing and review systems provide a user with not only an electronic "phonebook-type" listing of businesses, but also a recommendation of those businesses based on input from actual local customers. Consequently, community based business listing and review systems often provide a more relevant database of information to a given user by not only providing reviews associated with businesses within a reasonable distance of the user, but also the reviews posted are more likely to have come from the user's "neighbors". Consequently, the reviews are posted by people more likely to have similar needs so that community based business listing and review systems provide the user with a stronger sense of connection to his or her community. As result, community based business listing and review systems provide a recommendation function that feels more personalized to the user.

In order for a community based business listing and review system to fulfill its full potential, it is necessary to obtain a significant number of reviews of local businesses, and reviews in as many business listing categories as possible. Consequently, one of the major challenges facing any community based business listing and review system is to encourage customer/user participation in the review process, i.e., to encourage customers/users to take the time to submit reviews. Meeting this challenge has historically proven extremely difficult, especially for new community based business listing and review systems.

One way current community based business listing and review systems attempt to enlist customer/user participation is to contact previous users and generically, or blindly, request they submit reviews. These generic review requests are typically generated in a blind and blanket manner based on the needs of the community based business listing and review system, and without taking into account any specific data about the customer/user or their historical usage of the community based business listing and review system.

As an example, an exemplary community based business listing and review system provider may determine that more reviews in the business listing category "restaurants" are needed in a particular community. Currently, the community based business listing and review system provider will then send out a review request to all customers/users requesting they submit restaurant reviews. Consequently, these generic requests are often sent out to all users in all communities, on behalf of the community based business listing and review system provider, without any regard for a given customer/user's actual prior usage of the community based business listing and review system.

Historically, these generic review requests have been largely ignored by customers and therefore have proven of minimal effectiveness. One reason generic review requests fail is that they are viewed by they customer's as impersonal requests for the customer's input, time, and energy by a large business, i.e., the community based business listing and review system provider, and therefore the customer feels little or no sense of obligation or "community" associated with the request. In addition, the fact that all customers are being asked to review a requested business listing category, regardless of the specific individual user's actual location or historical usage of the community based business listing and review system, once again makes the request feel like an impersonal request from "just another large company trying to get me to help them make money". Consequently, as noted above, these generic requests are often viewed by the customer/user as an annoyance and the request is often ignored. As a result, community based business listing and review systems often fail to provide the desired variety and number of reviews needed and both the provider and users of the community based business listing and review system are denied the full potential of the system.

SUMMARY

In accordance with one embodiment, a method and apparatus for automatically soliciting business reviews includes a process for automatically soliciting business reviews whereby, in one embodiment, searches made, and/or reviews submitted, by individuals using a community based business listing and review system are monitored and user specific usage data is collected including: the user's identification; the business listing category in which a search was conducted and/or the business listing category in which a review was submitted by the user; and the community in which the user resides, and/or the community in which the search was made, and/or the community in which the business reviewed resides.

According to one embodiment, once user specific usage data about the user, and the searches the user conducts and/or the reviews the user has submitted, is gathered, the user specific usage data is then used to create user specific review solicitations of various types.

In one embodiment, the user specific usage data is used when a first user conducts a search for reviews in a selected business listing category having either relatively few, or no, reviews, or a business listing category that is deemed a priority business listing category by the provider of the community based business listings and review service employing the process for automatically soliciting business reviews. In this embodiment, the user specific usage data is collected including data indicating the business listing category searched and the user's contact information. Then when a review of a business in the weak and/or priority business listing category is later submitted by another user, the first user's user specific usage data is used to contact the first user and inform him or her that a new review has been submitted in the business listing category of their previous search. Using this embodiment, even when the first user conducts a relatively unsuccessful review search of a business listing category, the community based business listing and review system remembers the search and helps the first user by, in essence, continually monitoring the business listing category of the failed or weak search for the first user. In this way, a potentially lost customer/user is brought back to the community based business listing and review system application.

In one embodiment, the user specific usage data is used to connect two users in the same community and to solicit a review from one user who has previously submitted a review regarding a business in the community on behalf of another user in the same community. In this embodiment, when a first user conducts a review search in a first business listing category, the first user's user specific usage data is collected regarding the first user and the search. Then, in this embodiment, a second user in the same community who has submitted a review regarding another business, in another business listing category, is automatically contacted, using the second user's user specific usage data, and a review regarding the first business listing category is solicited from the second user on behalf of the first user. In this embodiment, at least three advantages are had. First, the review solicitation is being made to a user who has already submitted reviews and has therefore shown a willingness to participate in the process. Second, the review solicitation is being made to the second user based on an actual need of another user in the second user's community. Consequently, it is felt the second user is more likely to respond feeling that he or she is directly helping a neighbor rather than, or as well as, the provider of the community based business listing and review system. Third, using this embodiment, the first user and the second user are often members of the same community and therefore any review submitted by the second user will more likely be directly relevant to the needs of the first user.

In one embodiment, the user specific usage data is used to solicit a review from a user who has conducted a review search in a given business listing category automatically after a predefined period of time has elapsed. In this embodiment, when a first user conducts a search for reviews in a selected business listing category having either relatively few, or no, reviews, or a business listing category that is deemed a priority business listing category by the provider of the community based business listings and review service employing the process for automatically soliciting business reviews, the first user's user specific usage data is collected including data indicating the business listing category searched and the first user's contact information. Then after a predetermined period of time, if no review has been submitted by the first user, the first user is automatically contacted and a review is solicited regarding the specific business listing category in which the search was previously made. In this embodiment, process for automatically soliciting business reviews solicits reviews from the first user based on the theory that if the first user was conducting a review search, it is likely that the first user did indeed conduct business with a local merchant in the business listing category. Consequently, process for automatically soliciting business reviews waits a reasonable amount of time and then contacts the first user to solicit a review of the business he or she chose to use.

Using the method and apparatus for automatically soliciting business reviews, and a process for automatically soliciting business reviews, disclosed herein, review solicitations are made in an efficient and customized manner that is beneficial to both the provider of the community based business listing and review system and the user. In addition, the solicitations generated using the method and apparatus for automatically soliciting business reviews, and a process for automatically soliciting business reviews, disclosed herein are also more likely to yield results because they are based on a user's actual usage and information. In addition, in one embodiment, the review solicitations are made on behalf of another user in the community. Therefore, the user being solicited is more likely to respond knowing that another user, like themselves, is the beneficiary. Consequently, community based business listing and review systems employing a process for automatically soliciting business reviews disclosed herein is likely to receive more reviews, more relevant reviews, and a more loyal user base than current community based business listing and review systems that generate blanket and/or generic review requests.

In addition, as discussed in more detail below, using the below embodiments, with little or no modification and/or user input, there is considerable flexibility, adaptability, and opportunity for customization to meet the specific needs of various user's under numerous circumstances.

BRIEF DESCRIPTION OF THE DRAWINGS

FIG. 3A shows a representation of one embodiment of a community based business listing and review system display screen layout as would be seen on a display screen of a display device in accordance with the principles of one embodiment;

FIG. 3B shows a representation of one embodiment of a community based business listing and review system display screen layout as would be seen on a display screen of a display device in accordance with the principles of one embodiment;

FIG. 3C shows a representation of one embodiment of a community based business listing and review system display screen layout as would be seen on a display screen of a display device in accordance with the principles of one embodiment;

FIG. 5B shows one embodiment of a review solicitation display in accordance with one embodiment of a process for automatically soliciting business reviews;

Figure 1:
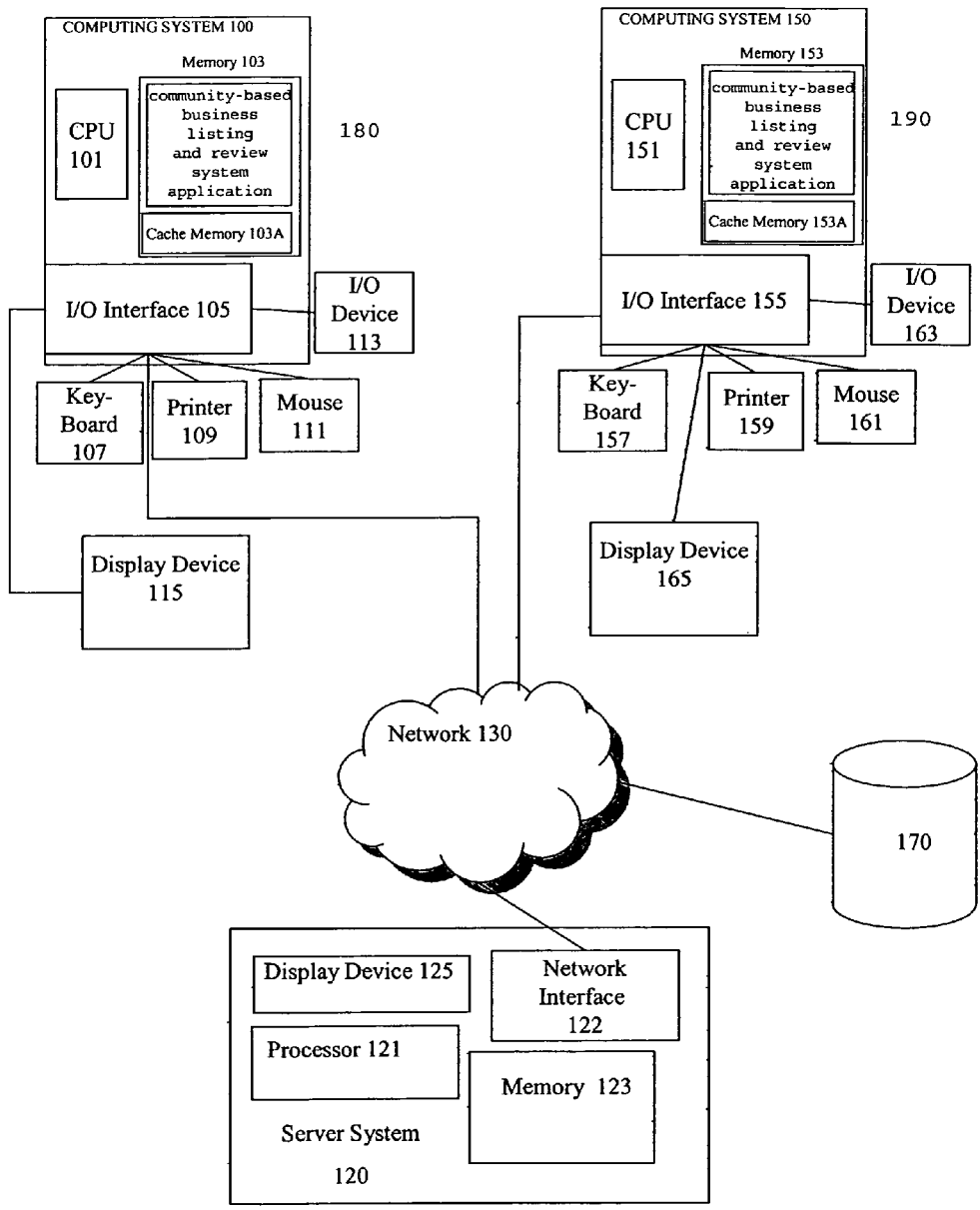
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and apparatus for automatically soliciting business reviews includes a process for automatically soliciting business reviews (200 in FIG. 2, 400 in FIG. 4A, 500 in FIG. 5A, 600 in FIG. 6, 700 in FIGS. 7 and 800 in FIG. 8) whereby, in one embodiment, searches made, and/or reviews submitted, by individuals using a c community based business listing and review system are monitored and user specific usage data is collected including: the user's identification; the business listing category in which a search was conducted and/or the business listing category in which a review was submitted by the user; and the community in which the user resides, and/or the community in which the search was made, and/or the community in which the business reviewed resides.

According to one embodiment of a process for automatically soliciting business reviews (200 in FIG. 2), once user specific usage data about the user, and the searches the user conducts and/or the reviews the user has submitted, is gathered, the user specific usage data is then used to create user specific review solicitations of various types.

In one embodiment of a process for automatically soliciting business reviews (400 in FIG. 4A), the user specific usage data is used when a first user conducts a search for reviews in a selected business listing category having either relatively few, or no, reviews, or a business listing category that is deemed a priority business listing category by the provider of the community based business listings and review service employing the process for automatically soliciting business reviews. In this embodiment, the user specific usage data is collected including data indicating the business listing category searched and the user's contact information. Then when a review of a business in the weak and/or priority business listing category is later submitted by another user, the first user's user specific usage data is used to contact the first user and inform him or her that a new review has been submitted in the business listing category of their previous search. Using this embodiment, even when the first user conducts a relatively unsuccessful review search of a business listing category, the community based business listing and review system remembers the search and helps the first user by, in essence, continually monitoring the business listing category of the failed or weak search for the first user. In this way, a potentially lost customer/user is brought back to the community based business listing and review system application.

In some embodiments of a process for automatically soliciting business reviews (500 in FIG. 5A, 600 in FIG. 6, 800 in FIG. 8), the user specific usage data is used to connect two user's in the same community and to solicit a review from one user who has previously submitted a review regarding a business in the community on behalf of another user in the same community. In one embodiment, when a first user conducts a review search in a first business listing category, the first user's user specific usage data is collected regarding the first user and the search. Then, in this embodiment, a second user in the same community who has submitted a review regarding another business, in another business listing category, is automatically contacted, using the second user's user specific usage data, and a review regarding the first business listing category is solicited from the second user on behalf of the first user. In this embodiment, at least three advantages are had. First, the review solicitation is being made to a user who has already submitted reviews and has therefore shown a willingness to participate in the process. Second, the review solicitation is being made to the second user based on an actual need of another user in the second user's community. Consequently, it is felt the second user is more likely to respond feeling that he or she is directly helping a neighbor rather than, or as well as, the provider of the community based business listing and review system. Third, using this embodiment, the first user and the second user are often members of the same community and therefore any review submitted by the second user will more likely be directly relevant to the needs of the first user.

In some embodiments of a process for automatically soliciting business reviews (700 in FIGS. 7 and 800 in FIG. 8), the user specific usage data is used to solicit a review from a user who has conducted a review search in a given business listing category automatically after a predefined period of time has elapsed. In this embodiment, when a first user conducts a search for reviews in a selected business listing category having either relatively few, or no, reviews, or a business listing category that is deemed a priority business listing category by the provider of the community based business listings and review service employing the process for automatically soliciting business reviews, the first user's user specific usage data is collected including data indicating the business listing category searched and the first user's contact information. Then after a predetermined period of time, if no review has been submitted by the first user, the first user is automatically contacted and a review is solicited regarding the specific business listing category in which the search was previously made. In this embodiment, process for automatically soliciting business reviews solicits reviews from the first user based on the theory that if the first user was conducting a review search, it is likely that the first user did indeed conduct business with a local merchant in the business listing category. Consequently, process for automatically soliciting business reviews waits a reasonable amount of time and then contacts the first user to solicit a review of the business he or she chose to use.

Using the method and apparatus for automatically soliciting business reviews, and a process for automatically soliciting business reviews, disclosed herein, review solicitations are made in an efficient and customized manner that is beneficial to both the provider of the community based business listing and review system and the user. In addition, the solicitations generated using the method and apparatus for automatically soliciting business reviews, and a process for automatically soliciting business reviews, disclosed herein are also more likely to yield results because they are based on a user's actual usage and information. In addition, in one embodiment, the review solicitations are made on behalf of another user in the community. Therefore, the user being solicited is more likely to respond knowing that another user, like themselves, is the beneficiary. Consequently, community based business listing and review systems employing a process for automatically soliciting business reviews disclosed herein is likely to receive more reviews, more relevant reviews, and a more loyal user base than current community based business listing and review systems that generate blanket and/or generic review requests.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether available or known at the time of filing or as developed later. Some embodiments are implemented in a mobile computing system running mobile operating systems such as Symbian® OS, Windows® Mobile, or any other operating system designed to generally manage operations on a mobile computing system, whether available or known at the time of filing or as developed later. As described more fully below, embodiments can be implemented on computing systems other than a conventional computing system such as, for example, a personal digital assistant, a cell phone, or other computing system capable of processing computer readable data, whether available at the time of filing or as developed later. Computing systems also include those in which one or more computing resources (hardware or software) are located remotely and accessed via network, such as a Local Area Network (LAN), Wide Area Network (WAN), a public network, such as the Internet, a private network, or other electronic medium in which data may be exchanged between one computing system and one or more other computing system(s), whether available at the time of filing or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, the community based business listing and review system applications described herein make use of input provided to the computer device implementing the process and/or application for automatically soliciting business reviews, discussed herein, via user interface devices such as a keyboard, mouse, touchpad, or any other device capable of providing user input to a computing system or for translating user actions into computing system operations, whether available or known at the time of filing or as developed later.

Hardware System Architecture

FIG. 1 is a block diagram of an exemplary hardware architecture for implementing one embodiment of a process and/or application for automatically soliciting business reviews, discussed herein, that includes: a computing system 100, e.g., a first computing system; a computing system 150, e.g., a second computing system; a server system 120; and a database 170, all operatively connected by a network 130.

As seen in FIG. 1, computing system 100 typically includes a central processing unit (CPU) 101, hereinafter processor 101, an input/output (I/O) interface 105, and a memory system 103, including cache memory 103A. In one embodiment, memory system 103 includes one or more community based business listing and review system applications 180 stored, in whole, or in part, therein, that are a parent system for, are used by, or include, as discussed below, a process and/or application for automatically soliciting business reviews, such as processes 200, 400, 500, 600, 700, and 800, discussed below.

Computing system 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port, or other device capable of inputting data to, and outputting data from, computing system 100, whether available or known at the time of filing or as later developed. As discussed in more detail below, in one embodiment, a process and/or application for automatically soliciting business reviews, such as processes 200, 400, 500, 600, 700, and 800, and a community based business listing and review system application 180, can be loaded, in whole, or in part, into computing system 100 via I/O device 113, such as from a CD, DVD or floppy disk containing all, or part, of community based business listing and review system application 180.

Similarly, computing system 150 typically includes a central processing unit (CPU) 151, hereinafter processor 151, an input/output (I/O) interface 155, and a memory system 153, including cache memory 153A. In one embodiment, memory system 153 includes one or more community based business listing and review system applications 190 stored, in whole, or in part, therein, that are a parent system for, are used by, or include, as discussed below, a process and/or application for automatically soliciting business reviews, such as processes 200, 400, 500, 600, 700, and 800.

Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed. As discussed in more detail below, in one embodiment, a process and/or application for automatically soliciting business reviews, such as processes 200, 400, 500, 600, 700, and 800, and a community based business listing and review system application 190, can be loaded, in whole, or in part, into computing system 150 via I/O device 163, such as from a CD, DVD or floppy disk containing all, or part, of community based business listing and review system application 190.

Also shown in FIG. 1 is database 170. In one embodiment, database 170 is a designated server system or computing system, or a designated portion of a server system or computing system, such as computing systems 100, 150 and 120. In one embodiment, database 170 is a dedicated mass storage device implemented in software, hardware, or a combination of hardware and software. In one embodiment, database 170 is a web-based function. As discussed in more detail below, in one embodiment, a process and/or application for automatically soliciting business reviews, such as processes 200, 400, 500, 600, 700, and 800, and/or community based business listing and review system application 180 and/or community based business listing and review system application 190 are stored in whole, or in part, in database 170.

In one embodiment, computing systems 100 and 150, and database 170, are coupled to a server system 120 by network 130. Server system 120 typically includes a server system display device 125, a server system processor 121, a server system memory 123, and a server system network interface 122. As discussed in more detail below, in one embodiment, a process and/or application for automatically soliciting business reviews, such as processes 200, 400, 500, 600, 700, and 800, and a community based business listing and review system application 180 and/or community based business listing and review system application 190 are stored in whole, or in part, in server system 120.

Network 130 can be any network or network system that is of interest to a user such as a Local Area Network (LAN), a Wide Area Network (WAN), a public network, such as the Internet, a private network, or other network capable of allowing communication between two or more computing systems, whether available or known at the time of filing or as later developed. In various embodiments, server system network interface 122 and I/O interfaces 105 and 155 include analog modems, digital modems, a network interface card, a broadband connection, or any other means for communicably coupling computing systems 100 and 150, database 170, and server system 120, via network 130, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network, as discussed herein. In addition, the particular type of, and configuration of, computing systems 100 and 150, database 170, and server system 120 are not relevant.

As discussed in more detail below, in one embodiment, a process and/or application for automatically soliciting business reviews, such as processes 200, 400, 500, 600, 700, and 800, and a community based business listing and review system application 180 and/or community based business listing and review system application 190 are stored in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for automatically soliciting business reviews, such as processes for automatically soliciting business reviews 200, 400, 500, 600, 700, and 800, and a community based business listing and review system application, such as community based business listing and review system applications 180 and/or 190, are sometimes referred to herein, alternatively, as a process, an application, a module, a program, a component of a software system, a component of a software package, a component of a parent system, or a feature of a parent system, this terminology is illustrative only. In some embodiments, a process and/or application for automatically soliciting business reviews, such as processes 200, 400, 500, 600, 700, and 800, and a community based business listing and review system application, such as community based business listing and review system applications 180 and/or 190, discussed herein, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as processors 101 and 151, or server system processor 121. In one embodiment, execution of a process and/or application for automatically soliciting business reviews, such as processes 200, 400, 500, 600, 700, and 800, and a community based business listing and review system application, such as community based business listing and review system applications 180 and/or 190, discussed herein, by processor 101, processor 151, or server system processor 121, results in the operations of an agent computer process (not shown) and/or a rule computer process (not shown).

In one embodiment, a process and/or application for automatically soliciting business reviews, such as processes 200, 400, 500, 600, 700, and 800, and a community based business listing and review system application, such as community based business listing and review system applications 180 and/or 190, discussed herein, are a computer application or process implemented and/or run and/or stored, in full, or in part, in, or on, a computer program product. Herein, a computer program product comprises a medium configured to store or transport computer readable code, whether available or known at the time of filing or as later developed. Some examples of computer program products are CD-ROM discs, DVDs, ROM cards, floppy discs, magnetic tapes, computer hard drives, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, the medium also may be removed from the computing system.

For example, all, or part, of a process and/or application for automatically soliciting business reviews, such as processes 200, 400, 500, 600, 700, and 800, and a community based business listing and review system application, such as community based business listing and review system applications 180 and/or 190, discussed herein, may be stored in a memory that is physically located in a location, such as server system memory 123, or database 170, of FIG. 1, different from a computing system, such as computing systems 100 and/or 150 of FIG. 1, utilizing a process and/or application for automatically soliciting business reviews, such as processes 200, 400, 500, 600, 700, and 800, and a community based business listing and review system application, such as community based business listing and review system applications 180 and/or 190. In one embodiment, all, or part, of a process and/or application for automatically soliciting business reviews, such as processes 200, 400, 500, 600, 700, and 800, and a community based business listing and review system application, such as community based business listing and review system applications 180 and/or 190, discussed herein, may be stored in a memory that is physically located, separate from the computing system's processor(s), such as processors 101 and 151 of FIG. 1, and the computing system processor(s) can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server systems, such as computing systems 100 and/or 150 and/or server system 120 of FIG. 1, running and/or utilizing and/or storing all, or part, of a process and/or application for automatically soliciting business reviews, such as processes 200, 400, 500, 600, 700, and 800, and a community based business listing and review system application, such as community based business listing and review system applications 180 and/or 190, discussed herein, is a portable computer, a workstation, a two-way pager, a cellular telephone, a smart phone, a digital wireless telephone, a personal digital assistant, a server computer, an Internet appliance, or any other device that includes components that can execute all, or part, of a process and/or application for automatically soliciting business reviews, such as processes 200, 400, 500, 600, 700, and 800, and a community based business listing and review system application, such as community based business listing and review system applications 180 and/or 190, discussed herein, in accordance with at least one of the embodiments as described herein. Similarly, in another embodiment, a process and/or application for automatically soliciting business reviews, such as processes 200, 400, 500, 600, 700, and 800, and a community based business listing and review system application, such as community based business listing and review system applications 180 and/or 190, discussed herein, are implemented on and/or run and/or stored on a computing system and/or server system that is comprised of multiple different computers, wireless devices, cellular telephones, digital telephones, two-way pagers, personal digital assistants, server computers, or any desired combination of these devices, that are interconnected to perform the processes as described herein.

Process

In one embodiment of a process for automatically soliciting business reviews, searches made, and/or reviews submitted, by individuals using a community based business listing and review system are monitored and user specific usage data is collected regarding: the user's identification; the business listing category in which a search was conducted and/or the business listing category in which a review was submitted by the user; and the community in which the user resides, and/or the community in which the search was made, and/or the community in which the business reviewed resides.

According to one embodiment, once user specific usage data about the user, and the searches the user conducts and/or the reviews the user has submitted, is gathered, the user specific usage data is then used to create user specific review solicitations of various types.

Figure 2:
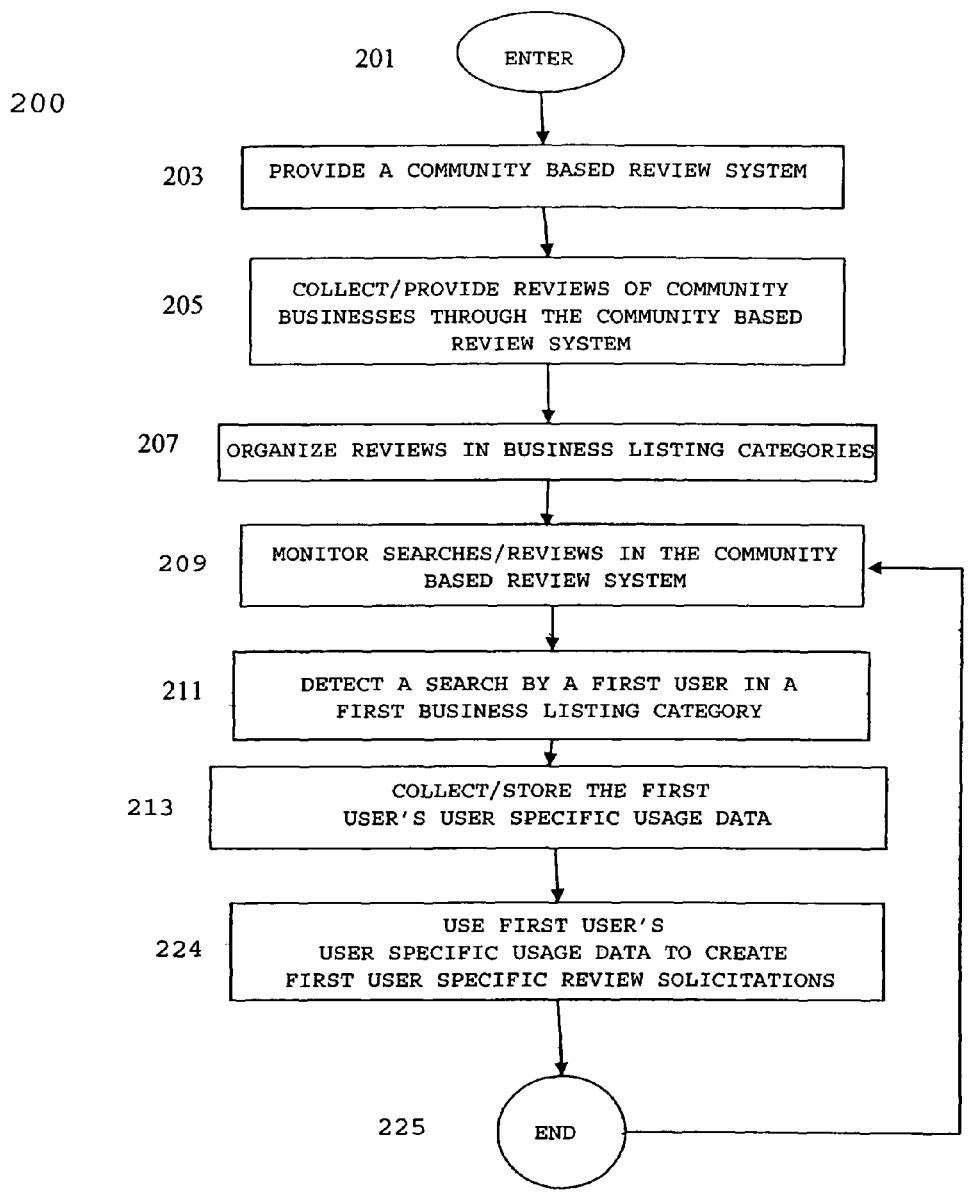
FIG. 2 is a flow chart depicting a process for automatically soliciting business reviews in accordance with one embodiment.

FIG. 2 is a flow chart depicting a process for automatically soliciting business reviews 200 in accordance with one embodiment. Process for automatically soliciting business reviews 200 begins at ENTER OPERATION 201 and process flow proceeds to PROVIDE A COMMUNITY BASED REVIEW SYSTEM OPERATION 203.

At PROVIDE A COMMUNITY BASED REVIEW SYSTEM OPERATION 203, a community based business listing and review system is provided. As noted above, community driven, or community based, business listing and review systems are typically Internet web-sties or portals that provide a review forum and recommendation service for business listings centered on a defined and/or selected geographical area such as a town or city. As also noted above, there exist several community based business listing and review systems. Community based business listing and review systems typically provide listings of local businesses, as well as a review/feedback forum and/or a rating system for the businesses listed. Community based business listing and review systems typically provide a user with not only an electronic "phonebook-type" listing of businesses, but also a recommendation system for those businesses based on input/reviews from actual local customers.

In one embodiment, business listing categories are provided to the user via a display screen on a display device such as display devices 115, 165 or 125 of a computing system, such as computing system 100, computing system 150, or server system 120 of FIG. 1. FIG. 3A and FIG. 3B show representations of one embodiment of display screen layouts 300A and 300B as they would be seen on a display screen of a display device using a community based business listing and review system such as is provided at PROVIDE A COMMUNITY BASED REVIEW SYSTEM OPERATION 203.

As seen in FIG. 3A, in one embodiment, display screen layout 300A includes: search window 301; location window 303; general business listing categories 305, including exemplary general business listing category 305A, "Retail Stores", and specific business listing categories 307, including exemplary specific business listing category 307A, "Computer".

Search window 301 of display screen layout 300A provides a user with the ability to designate a business listing category or name and then search for that business within a specified radius of a specified location or community. Location window 303 provides the user with the ability to specify a community, i.e., city or state, or other local grouping, within which the business listing categories listed in general business listing categories 305 are located.

General business listing categories 305 provides the user with general business listing categories within which the businesses are categorized. In one embodiment, the user activates a desired general business listing category within business listing category 305 by interfacing with display screen layout 300A using a user interface device such a keyboard 107, 157, or a mouse 111, 161, of a computing system, such as computing system 100, computing system 150, and/or server system 120 of FIG. 1, or any other user interface device available at the time of filing, or developed later and/or discussed herein.

In one embodiment a desired general business listing category within general business listing categories 305 of FIG. 3A is activated by moving a cursor (not shown) and clicking, or otherwise activating, a general business listing category icon, such as exemplary general business listing category icon 305A, "Retail Stores", or from a pull down menu or other display (not shown) at general business listing categories 305 of FIG. 3A, or by hovering the cursor over the desired general business listing category. As an example, in FIG. 3A, the exemplary general business listing category 305A, "Retail Stores", is shown as having been activated.

As also shown in FIG. 3A, once a desired general business listing category within general business listing categories 305 has been activated, in one embodiment, specific business listing categories 307 is displayed. In one embodiment, specific business listing categories 307 lists store types, or products offered, within the general business listing category selected of general business listing categories 305. As an example, as shown in FIG. 3A, once the exemplary general business listing category 305A, "Retail Stores", is activated, specific business listing categories 307 shows various business listing categories of retail stores, including exemplary specific business listing category 307A, "Computer".

In one embodiment, a chosen specific business listing category within specific business listing categories 307 of FIG. 3A is activated by moving a cursor (not shown) and clicking on the desired specific business listing category, or hovering the cursor over the desired specific business listing category, or by any other method as discussed above. As an example, in FIG. 3A the exemplary specific business listing category 307A, "Computer", is shown as having been activated.

Referring to FIG. 3B, in one embodiment, once a specific business listing category, such as specific business listing category 307A, "Computer", is activated, a listing of businesses within the specific business listing category of specific business listing categories 307, of general business listing categories 305, within the community specified in search window 301 and/or location window 303, of display screen layout 300A, of FIG. 3A, is displayed in provider listings window 310 of FIG. 3B. As shown in FIG. 3B, business listing window 310 includes a listing of businesses 311, 312, 313, 314, and 315, along with various contact information including business name, phone number, and address.

Those of skill in the art will readily recognize that the choice of information displayed, the organization of the information displayed, and the manner in which the information is displayed in FIG. 3A and FIG. 3B was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed on display screen layouts 300A and 300B of FIG. 3A and FIG. 3B are possible, and that the specific means discussed above do not limit the invention as set forth in the claims below.

One specific example of a community based business listing and review system is the Zipingo® community based business listing and review system of Intuit Corporation, of Mountain View Calif., and found at http://www.zipingo.com/portal/home.psml.

Community based business listing and review systems, as well as methods and apparatuses for implementing community based business listing and review systems, are well-known to those of skill in the art. Consequently, a more detailed discussion of community based business listing and review systems, as well as methods and apparatuses for implementing community based business listing and review systems is omitted here to avoid detracting from the invention.

In one embodiment, the community based business listing and review system includes a community based business listing and review system application such as community based business listing and review system applications 180 and 190 of FIG. 1. In one embodiment, the community based business listing and review system provided at PROVIDE A COMMUNITY BASED REVIEW SYSTEM OPERATION 203 is a parent system for, and includes process for automatically soliciting business reviews 200 as a function or module. In one embodiment, process for automatically soliciting business reviews 200 is a stand alone system.

In one embodiment, once a community based business listing and review system is provided at PROVIDE A COMMUNITY BASED REVIEW SYSTEM OPERATION 203, process flow proceeds to COLLECT/PROVIDE REVIEWS OF COMMUNITY BUSINESSES THROUGH THE COMMUNITY BASED REVIEW SYSTEM OPERATION 205.

At COLLECT/PROVIDE REVIEWS OF COMMUNITY BUSINESSES THROUGH THE COMMUNITY BASED REVIEW SYSTEM OPERATION 205 the community based business listing and review system provided at PROVIDE A COMMUNITY BASED REVIEW SYSTEM OPERATION 203 solicits and collects reviews of businesses by user's and organizes them by community.

In one embodiment, once the reviews are collected at COLLECT/PROVIDE REVIEWS OF COMMUNITY BUSINESSES THROUGH THE COMMUNITY BASED REVIEW SYSTEM OPERATION 205, process flow proceeds to ORGANIZE REVIEWS IN BUSINESS LISTING CATEGORIES OPERATION 207.

At ORGANIZE REVIEWS IN BUSINESS LISTING CATEGORIES OPERATION 207 the business reviews collected and organized by community at COLLECT/PROVIDE REVIEWS OF COMMUNITY BUSINESSES THROUGH THE COMMUNITY BASED REVIEW SYSTEM OPERATION 205 are further organized by business listing category, such as general business listing categories 305 and specific business listing categories 307 of FIGS. 3A and 3B.

Referring again to FIG. 3B, in one embodiment, each of the businesses 311, 312, 313, 314, and 315 listed in business listing window 310 includes the entry "Overall Rating" along with, in one embodiment, a number of stars representing the average of the accumulated individual reviewer ratings associated with each of the businesses 311, 312, 313, 314, and 315 listed in business listing window 310. Consequently, in one embodiment, at ORGANIZE REVIEWS IN BUSINESS LISTING CATEGORIES OPERATION 207 a user is provided with an immediate visual representation of the overall customer rating of the businesses 311, 312, 313, 314, and 315 listed in business listing window 310.

Those of skill in the art will recognize that while stars were chosen herein to represent an individual reviewer's rating and/or the average of the accumulated individual reviewer ratings, virtually any discrete symbol or symbols may be used. In addition, any singular symbol or graphical display capable of visually representing an individual reviewer's rating and/or the average of the accumulated individual reviewer ratings may be used. As an example, a thermometer, a sliding scale, any graphical representation, or any partially filed figure or symbol, or outline thereof may be used. Moreover, these symbols, graphical displays, and scales may, in some embodiments, display either an individual reviewer's level of satisfaction or dissatisfaction and/or the average of the accumulated individual reviewer's satisfaction or dissatisfaction. Consequently the specific symbol of stars discussed herein was chosen for illustrative purposes only and does not limit the scope as claimed.

In one embodiment, a user may wish to search each of the detailed reviews associated with particular businesses 311, 312, 313, 314, and 315 listed in business listing window 310. In this case, in one embodiment, the user can activate the desired businesses 311, 312, 313, 314, and 315 listed in business listing window 310 by moving a cursor (not shown) and clicking on the desired business 311, 312, 313, 314, 315 listing, or an icon (not shown), or hovering the cursor over the desired business 311, 312, 313, 314, 315 listing, or icon (not shown). As an example, in FIG. 3B, the exemplary business 312, "Computer Store Two", is shown as having been activated.

Referring now to FIG. 3C, and display screen layout 300C, once the desired business 311, 312, 313, 314, 315 listed in business listing window 310 is activated, a screen layout 300C is generated showing each of the detailed reviews, such as reviews 331 and 332 in FIG. 3C, along with the individual reviewer ratings, in this example, in the form of stars.

In one embodiment, once the business reviews collected and organized by community at COLLECT/PROVIDE REVIEWS OF COMMUNITY BUSINESSES THROUGH THE COMMUNITY BASED REVIEW SYSTEM OPERATION 205 are further organized by business listing category at ORGANIZE REVIEWS IN BUSINESS LISTING CATEGORIES OPERATION 207, process flow proceeds to MONITOR SEARCHES/REVIEWS IN THE COMMUNITY BASED REVIEW SYSTEM OPERATION 209.

At MONITOR SEARCHES/REVIEWS IN THE COMMUNITY BASED REVIEW SYSTEM OPERATION 209 all searches of the various business listing categories, such as general business listing categories 305 and specific business listing categories 307 of FIGS. 3A and 3B, and all submitted reviews, such as reviews 331 and 332 in FIG. 3C, are monitored by the provider of the community based business listing and review system implementing process for automatically soliciting business reviews 200 from PROVIDE A COMMUNITY BASED REVIEW SYSTEM OPERATION 203 and/or the provider of process for automatically soliciting business reviews 200.

Methods, apparatuses, and structures for monitoring user interaction with a database, and entries within the database, are well known to those of skill in the art. Consequently, a more detailed discussion of the methods, apparatuses, and structures for monitoring all searches of the various business listing categories and reviews submitted at MONITOR SEARCHES/REVIEWS IN THE COMMUNITY BASED REVIEW SYSTEM OPERATION 209 is omitted here to avoid detracting from the invention.

In one embodiment, once all searches of the various business listing categories, such as general business listing categories 305 and specific business listing categories 307 of FIGS. 3A and 3B, and all submitted reviews, such as reviews 331 and 332 in FIG. 3C, are being monitored at MONITOR SEARCHES/REVIEWS IN THE COMMUNITY BASED REVIEW SYSTEM OPERATION 209, process flow proceeds to DETECT A SEARCH BY A FIRST USER IN A FIRST BUSINESS LISTING CATEGORY OPERATION 211.

At DETECT A SEARCH BY A FIRST USER IN A FIRST BUSINESS LISTING CATEGORY OPERATION 211 a review search by a first user of any of the various business listing categories, such as general business listing categories 305 and specific business listing categories 307 of FIGS. 3A and 3B, and/or a review submitted in any of the various business listing categories, such as reviews 331 and 332 in FIG. 3C, is detected.

In one embodiment, once a review search by a first user of any of the various business listing categories, such as general business listing categories 305 and specific business listing categories 307 of FIGS. 3A and 3B, and/or a review submitted in any of the various business listing categories, such as reviews 331 and 332 in FIG. 3C, is detected at DETECT A SEARCH BY A FIRST USER IN A FIRST BUSINESS LISTING CATEGORY OPERATION 211, process flow proceeds to COLLECT/STORE THE FIRST USER'S USER SPECIFIC USAGE DATA OPERATION 213.

At COLLECT/STORE THE FIRST USER'S USER SPECIFIC USAGE DATA OPERATION 213 information regarding: the first user's identification and/or the first user's contact information, such as his or her e-mail address; the business listing category searched or the business listing category in which a review was submitted; the community in which the first user resides and/or the business being reviewed resides and/or the community in which the search was conducted; and any other information about the first user available and desired, is collected and stored by the provider of the community based business listing and review system implementing process for automatically soliciting business reviews 200 from PROVIDE A COMMUNITY BASED REVIEW SYSTEM OPERATION 203 and/or the provider of process for automatically soliciting business reviews 200.

Herein, the first user's identification and/or the first user's contact information, such as his or her e-mail address; the business listing category searched or the business listing category in which a review was submitted; the community in which the first user resides and/or the business being reviewed resides and/or the community in which the search was conducted; and any other information about the first user available and desired, is also collectively referred to as the user specific usage data.

In one embodiment, some of the user specific usage data, such as the first user's identification and/or the first user's contact information, such as his or her e-mail address, is acquired by the provider of the community based business listing and review system implementing process for automatically soliciting business reviews 200 when a user initially registers as a user with the provider of the community based business listing and review system implementing process for automatically soliciting business reviews 200 and/or the provider of process for automatically soliciting business reviews 200. In one embodiment, permission to collect and store user specific usage data is also obtained from the user at the time of registration.

In some embodiments, any of the numerous methods, apparatuses, and structures, whether implemented in hardware, software, or a combination of hardware and software, for collecting data, such as user specific usage data, whether known at the time of filing or as developed thereafter, are used to collect user specific usage data at COLLECT/STORE THE FIRST USER'S USER SPECIFIC USAGE DATA OPERATION 213.

Methods, apparatuses, and structures for obtaining data associated with a user and relating to specific searches and submissions into a community based business listing and review system, or any web site, are well known to those of skill in the art. Consequently, a more detailed discussion of the methods, apparatuses, and structures for collecting user specific usage data at COLLECT/STORE THE FIRST USER'S USER SPECIFIC USAGE DATA OPERATION 213 is omitted here to avoid detracting from the invention.

Once the user specific usage data is collected at COLLECT/STORE THE FIRST USER'S USER SPECIFIC USAGE DATA OPERATION 213, the data is stored and/or saved by storing/saving the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in a computer readable medium, and/or any other computer program product, as defined herein. In one embodiment, the data, in whole, or in part, is stored on a webpage or in a web-based system.

In some embodiments, the means for storing the data described above are maintained, in whole, or in part, by: the user, or a user computing system; a third party data storage institution; the provider of a community based business listing and review system implementing process for automatically soliciting business reviews, such as processes 200, 400, 500, 600, 700, and 800; the provider of a process for automatically soliciting business reviews, such as processes 200, 400, 500, 600, 700, and 800; any third party service or institution; or any other parties.

In one embodiment, once the user specific usage data is collected and stored at COLLECT/STORE THE FIRST USER'S USER SPECIFIC USAGE DATA OPERATION 213, process flow proceeds to USE FIRST USER'S USER SPECIFIC USAGE DATA TO CREATE FIRST USER SPECIFIC REVIEW SOLICITATIONS OPERATION 224.

At USE FIRST USER'S USER SPECIFIC USAGE DATA TO CREATE FIRST USER SPECIFIC REVIEW SOLICITATIONS OPERATION 224, the user specific usage data collected and stored at COLLECT/STORE THE FIRST USER'S USER SPECIFIC USAGE DATA OPERATION 213 is used to formulate business review solicitations that are specifically tailored to the first user based on the user specific usage data.

As an example, in one embodiment, only solicitations for business reviews directly related to the search, or all searches, detected at DETECT A SEARCH BY A FIRST USER IN A FIRST BUSINESS LISTING CATEGORY OPERATION 211 are sent to the first user. As another example, only solicitations for businesses within the community of the first user, as determined from the user specific usage data of COL- LECT/STORE THE FIRST USER'S USER SPECIFIC USAGE DATA OPERATION 213 are sent to the first user. As another example, if the user specific usage data collected at COLLECT/STORE THE FIRST USER'S USER SPECIFIC USAGE DATA OPERATION 213 indicates that the first user has submitted a review in a first business listing category, a review solicitation in a related business listing category may be sent to the first user. In other examples, any of the user specific usage data collected at COLLECT/STORE THE FIRST USER'S USER SPECIFIC USAGE DATA OPERATION 213 can be used to generate and send review solicitations specifically targeted to the first user based on the first user's user specific usage data collected at COLLECT/STORE THE FIRST USER'S USER SPECIFIC USAGE DATA OPERATION 213.

In one embodiment, once the user specific usage data collected and stored at COLLECT/STORE THE FIRST USER'S USER SPECIFIC USAGE DATA OPERATION 213 is used to formulate business review solicitations that are specifically tailored to the first user based on the user specific usage data at USE FIRST USER'S USER SPECIFIC USAGE DATA TO CREATE FIRST USER SPECIFIC REVIEW SOLICITATIONS OPERATION 224, process flow proceeds to END OPERATION 225 and, in one embodiment, process for automatically soliciting business reviews 200 returns to MONITOR SEARCHES OF THE COMMUNITY BASED REVIEW SYSTEM OPERATION 209.

Using one embodiment of process for automatically soliciting business reviews 200, the first user tailored review solicitations are generated automatically based on the first user's user specific usage data based on user-defined parameters and algorithms that will vary from community based business listing and review system-to-community based business listing and review system and implications and/or embodiment of process for automatically soliciting business reviews-to-process for automatically soliciting business reviews.

Using process for automatically soliciting business reviews 200 review solicitations can be generated specifically targeting specific user's based on actual data regarding the user solicited. Consequently, the informal blind and carpet review solicitations currently used are avoided. In addition, in other embodiments, the user specific usage data collected at COLLECT/STORE THE FIRST USER'S USER SPECIFIC USAGE DATA OPERATION 213 can be used in numerous other ways to solicit reviews in a even more customized and personal matter.

For instance, in one embodiment, the user specific usage data is used when a first user conducts a search for reviews in a selected business listing category having either relatively few, or no, reviews, or a business listing category that is deemed a priority business listing category by the provider of the community based business listings and review service employing the process for automatically soliciting business reviews. In this embodiment, the user specific usage data is collected including data indicating the business listing category searched and the user's contact information. Then when a review of a business in the weak and/or priority business listing category is later submitted by another user, the user specific usage data is used to contact the first user and inform him or her that a new review has been submitted in the business listing category of the first user's previous search.

Figure 4A:
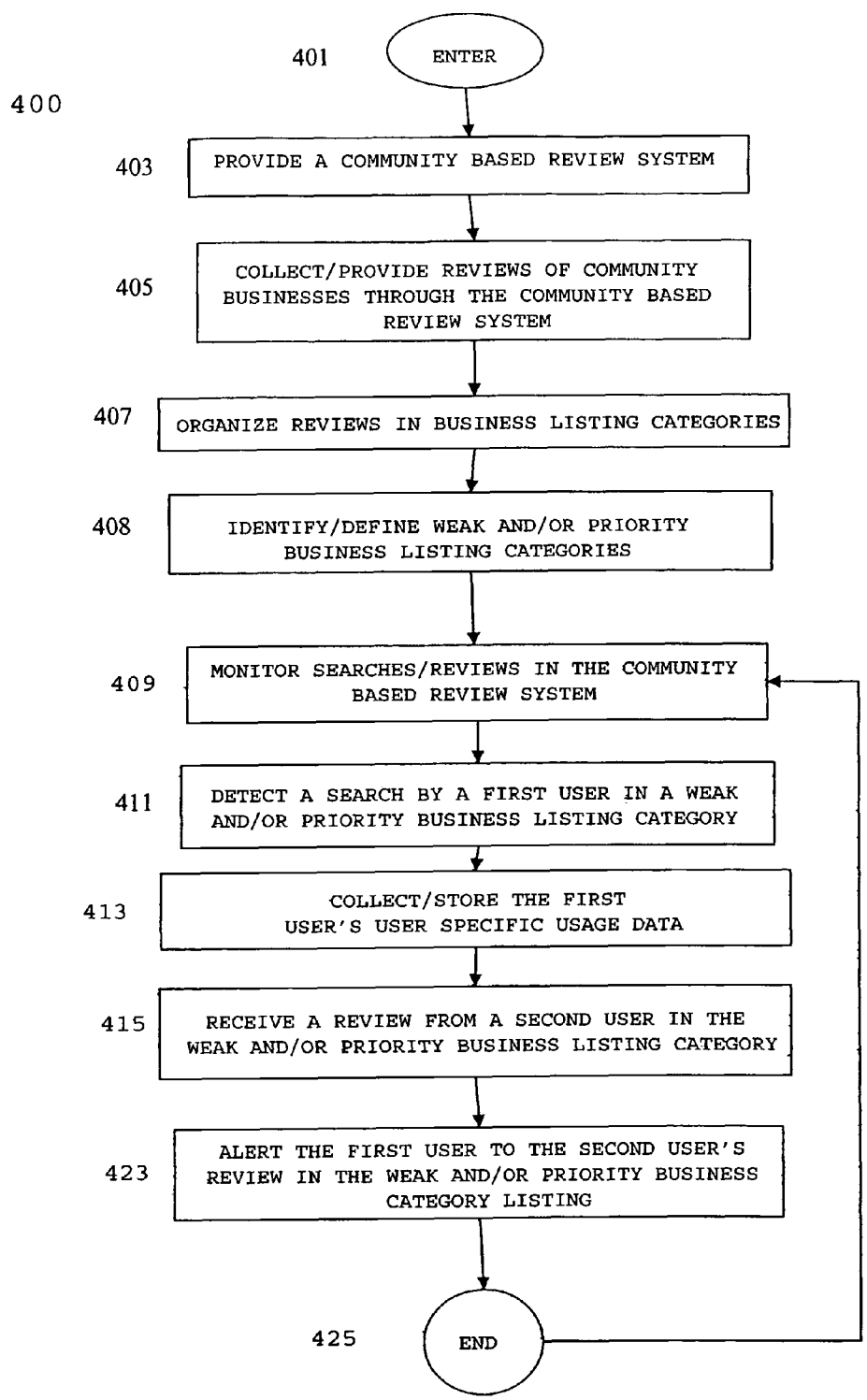
FIG. 4A is a flow chart depicting a process for automatically soliciting business reviews in accordance with one embodiment.

FIG. 4A is a flow chart depicting a process for automatically soliciting business reviews 400 in accordance with one embodiment. Process for automatically soliciting business reviews 400 begins at ENTER OPERATION 401 and process flow proceeds to PROVIDE A COMMUNITY BASED REVIEW SYSTEM OPERATION 403.

PROVIDE A COMMUNITY BASED REVIEW SYSTEM OPERATION 403; COLLECT/PROVIDE REVIEWS OF COMMUNITY BUSINESSES THROUGH THE COMMUNITY BASED REVIEW SYSTEM OPERATION 405; and ORGANIZE REVIEWS IN BUSINESS LISTING CATEGORIES OPERATION 407 are substantially identical to: PROVIDE A COMMUNITY BASED REVIEW SYSTEM OPERATION 203; COLLECT/PROVIDE REVIEWS OF COMMUNITY BUSINESSES THROUGH THE COMMUNITY BASED REVIEW SYSTEM OPERATION 205; and ORGANIZE REVIEWS IN BUSINESS LISTING CATEGORIES OPERATION 207 discussed above with respect to process for automatically soliciting business reviews 200 of FIG. 2. Consequently, the discussion above with respect to: PROVIDE A COMMUNITY BASED REVIEW SYSTEM OPERATION 203; COLLECT/PROVIDE REVIEWS OF COMMUNITY BUSINESSES THROUGH THE COMMUNITY BASED REVIEW SYSTEM OPERATION 205; and ORGANIZE REVIEWS IN BUSINESS LISTING CATEGORIES OPERATION 207 of process for automatically soliciting business reviews 200 of FIG. 2 is applicable to, and incorporated here for: similarly named and labeled elements of PROVIDE A COMMUNITY BASED REVIEW SYSTEM OPERATION 403; COLLECT/PROVIDE REVIEWS OF COMMUNITY BUSINESSES THROUGH THE COMMUNITY BASED REVIEW SYSTEM OPERATION 405; and ORGANIZE REVIEWS IN BUSINESS LISTING CATEGORIES OPERATION 407 of process for automatically soliciting business reviews 400 of FIG. 4A.

In one embodiment, once the business reviews collected and organized by community at COLLECT/PROVIDE REVIEWS OF COMMUNITY BUSINESSES THROUGH THE COMMUNITY BASED REVIEW SYSTEM OPERATION 405 are further organized by business listing category at ORGANIZE REVIEWS IN BUSINESS LISTING CATEGORIES OPERATION 407, process flow proceeds to IDENTIFY/DEFINE WEAK AND/OR PRIORITY BUSINESS LISTING CATEGORIES OPERATION 408.

At IDENTIFY/DEFINE WEAK AND/OR PRIORITY BUSINESS LISTING CATEGORIES OPERATION 408 business listing categories within the community based business listing and review system, such as general business listing categories 305 and specific business listing categories 307 of FIGS. 3A and 3B, that have relatively few business reviews, such as reviews 331 and 332 in FIG. 3C, or have been designated priority review categories are identified.

Returning to FIG. 4A, in one embodiment, at IDENTIFY/DEFINE WEAK AND/OR PRIORITY BUSINESS LISTING CATEGORIES OPERATION 408 a user is provided with an opportunity to designate a threshold number of reviews, such as reviews 331 and 332 in FIG. 3C, below which a business listing category, such as general business listing categories 305 and specific business listing categories 307 of FIGS. 3A and 3B category is considered a weak category. In one embodiment, the threshold number of reviews is also based on the age of the reviews. That is to say, in one embodiment, a threshold number of relatively recent reviews, such as reviews 331 and 332 in FIG. 3C is defined below which a business listing category, such as general business listing categories 305 and specific business listing categories 307 of FIGS. 3A and 3B, is considered a weak category. The threshold number of reviews, the threshold age of the reviews, and any other threshold values, in one embodiment, is user, and/or provider of the community based business listing and review system implementing process for automatically soliciting business reviews 400, and/or provider of process for automatically soliciting business reviews 400, defined.

Returning to FIG. 4A, in one embodiment, at IDENTIFY/DEFINE WEAK AND/OR PRIORITY BUSINESS LISTING CATEGORIES OPERATION 408 the user, and/or provider of the community based business listing and review system implementing process for automatically soliciting business reviews 400, and/or provider of process for automatically soliciting business reviews 400, is provided the opportunity to define "priority" categories. In one embodiment, priority categories can be defined for any reason desired, including, but not limited to: promotional considerations; seasonal considerations; specific events; and/or any other reason considered relevant by the user, and/or provider of the community based business listing and review system implementing process for automatically soliciting business reviews 400, and/or provider of process for automatically soliciting business reviews 400.

In one embodiment, once the business listing categories within the community based business listing and review system, such as general business listing categories 305 and specific business listing categories 307 of FIGS. 3A and 3B, that have relatively few business reviews, such as reviews 331 and 332 in FIG. 3C, or have been designated priority review categories are identified at IDENTIFY/DEFINE WEAK AND/OR PRIORITY BUSINESS LISTING CATEGORIES OPERATION 408 of FIG. 4A, process flow proceeds to MONITOR SEARCHES/REVIEWS IN THE COMMUNITY BASED REVIEW SYSTEM OPERATION 409.

MONITOR SEARCHES/REVIEWS IN THE COMMUNITY BASED REVIEW SYSTEM OPERATION 409; DETECT A SEARCH BY A FIRST USER IN A WEAK AND/OR PRIORITY BUSINESS LISTING CATEGORY OPERATION 411; and COLLECT/STORE THE FIRST USER'S USER SPECIFIC USAGE DATA OPERATION 413 of process for automatically soliciting business reviews 400 are substantially identical to MONITOR SEARCHES OF THE COMMUNITY BASED REVIEW SYSTEM OPERATION 209; DETECT A SEARCH BY A FIRST USER IN A FIRST BUSINESS LISTING CATEGORY OPERATION 211; and COLLECT/STORE DATA REPRESENTING THE FIRST USER'S CONTACT INFORMATION AND COMMUNITY OPERATION 213 of process for automatically soliciting business reviews 200 of FIG. 2. Consequently, the discussion above with respect to MONITOR SEARCHES OF THE COMMUNITY BASED REVIEW SYSTEM OPERATION 209; DETECT A SEARCH BY A FIRST USER IN A FIRST BUSINESS LISTING CATEGORY OPERATION 211; and COLLECT/STORE DATA REPRESENTING THE FIRST USER'S CONTACT INFORMATION AND COMMUNITY OPERATION 213 applies to, and is incorporated here for, MONITOR SEARCHES/REVIEWS IN THE COMMUNITY BASED REVIEW SYSTEM OPERATION 409; DETECT A SEARCH BY A FIRST USER IN A WEAK AND/OR PRIORITY BUSINESS LISTING CATEGORY OPERATION 411; and COLLECT/STORE THE FIRST USER'S USER SPECIFIC USAGE DATA OPERATION 413 of process for automatically soliciting business reviews 400.

Returning to FIG. 4A, in one embodiment, once the user specific usage data is collected and stored at COLLECT/STORE THE FIRST USER'S USER SPECIFIC USAGE DATA OPERATION 413, process flow proceeds to RECEIVE A REVIEW FROM A SECOND USER IN THE WEAK AND/OR PRIORITY BUSINESS LISTING CATEGORY OPERATION 415.

At RECEIVE A REVIEW FROM A SECOND USER IN THE WEAK AND/OR PRIORITY BUSINESS LISTING CATEGORY OPERATION 415, a review is submitted and received from a second user in the weak and/or priority business listing category defined at IDENTIFY/DEFINE WEAK AND/OR PRIORITY BUSINESS LISTING CATEGORIES OPERATION 408 and searched by the first user at DETECT A SEARCH BY A FIRST USER IN A WEAK AND/OR PRIORITY BUSINESS LISTING CATEGORY OPERATION 411.

In one embodiment, once the review is submitted and received from a second user in the weak and/or priority business listing category at RECEIVE A REVIEW FROM A SECOND USER IN THE WEAK AND/OR PRIORITY BUSINESS LISTING CATEGORY OPERATION 415, process flow proceeds to ALERT THE FIRST USER TO THE SECOND USER'S REVIEW IN THE WEAK AND/OR PRIORITY BUSINESS LISTING CATEGORY OPERATION 423.

At ALERT THE FIRST USER TO THE SECOND USER'S REVIEW IN THE WEAK AND/OR PRIORITY BUSINESS LISTING CATEGORY OPERATION 423, an alert and/or notification is sent to the first user using the first user's user specific usage data collected and stored at COLLECT/STORE THE FIRST USER'S USER SPECIFIC USAGE DATA OPERATION 413. In one embodiment, the alert and/or notification informs the first user of the review submitted by the second user that is now available for viewing through the community based business listing and review system implementing process for automatically soliciting business reviews 400.

In one embodiment, the alert and/or notification generated at ALERT THE FIRST USER TO THE SECOND USER'S REVIEW IN THE WEAK AND/OR PRIORITY BUSINESS LISTING CATEGORY OPERATION 423 is accomplished via communication between one or more computing systems such as computing systems 100 and 150 of FIG. 1 using a network such as network 130 that can be any network or network system that is of interest to a user such as a Local Area Network (LAN), a Wide Area Network (WAN), a public network, such as the Internet, a private network, or other network capable of allowing communication between two or more computing systems. In one embodiment, communication is facilitated using analog modems, digital modems, network interface cards, broadband connections, or any other means for communicably coupling computing systems, whether known at the time of filing or as later developed.

Returning to FIG. 4A, in one embodiment, the alert and/or notification is generated at ALERT THE FIRST USER TO THE SECOND USER'S REVIEW IN THE WEAK AND/OR PRIORITY BUSINESS LISTING CATEGORY OPERATION 423 and distributed via phone lines, phone signals or any other form of electronic audio/video/text or alert messaging and/or communication known at the time of filing or as later developed.

Figure 4B:
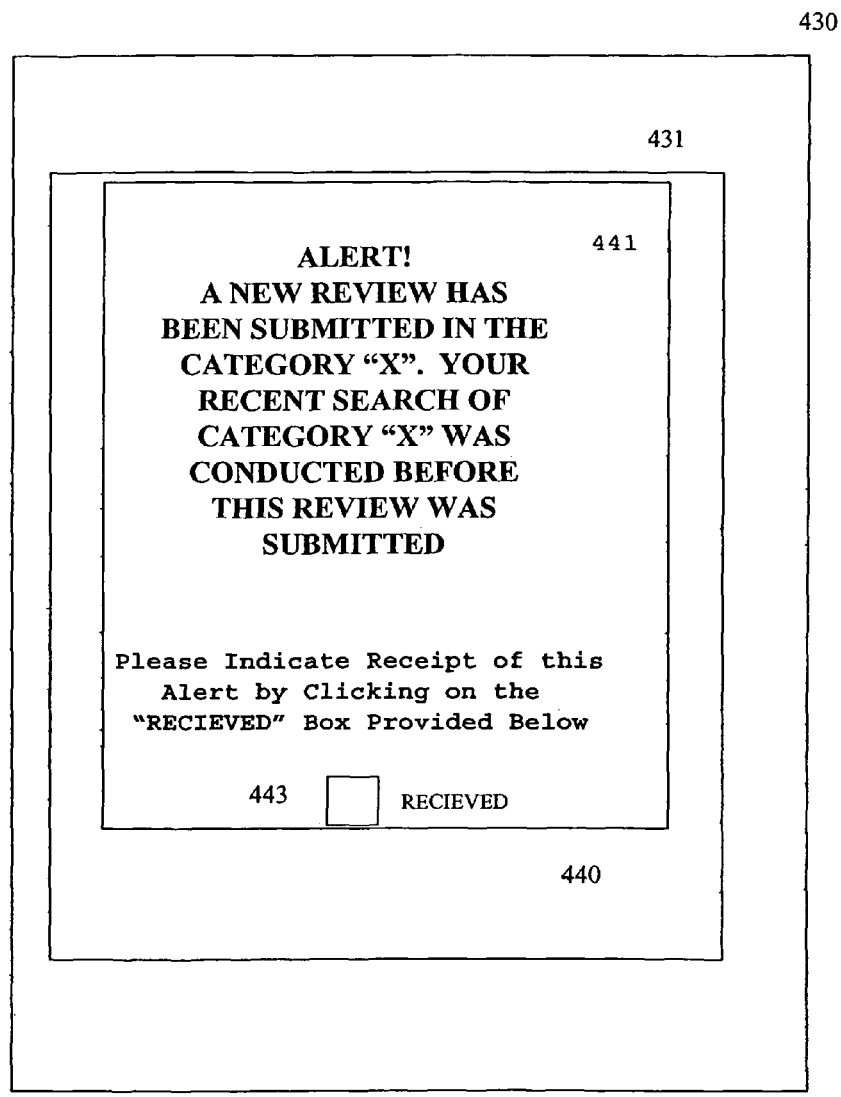
FIG. 4B shows one embodiment of an alert of a new review in accordance with one embodiment of a process for automatically soliciting business reviews.

In one embodiment, the alert and/or notification generated at ALERT THE FIRST USER TO THE SECOND USER'S REVIEW IN THE WEAK AND/OR PRIORITY BUSINESS LISTING CATEGORY OPERATION 423 is in the form of a pop-up display shown on a display device such as display devices 115, 165, 125 of FIG. 1. FIG. 4B shows a representation of a display screen 431 on display device 430, such as display devices 115 and 165 of FIG. 1, including an alert display 440 (FIG. 4B) activated at ALERT THE FIRST USER TO THE SECOND USER'S REVIEW IN THE WEAK AND/OR PRIORITY BUSINESS LISTING CATEGORY OPERATION 423 (FIG. 4A) notifying the user that the new review has submitted by the second user at RECEIVE A REVIEW FROM A SECOND USER IN THE WEAK AND/OR PRIORITY BUSINESS LISTING CATEGORY OPERATION 415 in the weak and/or priority business listing category defined at IDENTIFY/DEFINE WEAK AND/OR PRIORITY BUSINESS LISTING CATEGORIES OPERATION 408 and searched previously by the first user at DETECT A SEARCH BY A FIRST USER IN A WEAK AND/OR PRIORITY BUSINESS LISTING CATEGORY OPERATION 411

As seen in FIG. 4B, alert display 440 includes alert text 441 indicating, in this specific example, that a new review has been submitted, in this example submitted by the second user, in the weak and/or priority business listing category, in this example designated category "X", and that the new review was submitted after the first user had conducted the previous search of category "X".

Those of skill in the art will readily recognize that the one example of an alert shown in FIG. 4B is exemplary only and that the information displayed, and the arrangement of the information displayed, in alert display 440 will vary significantly from process-to-process and user-to-user. In other embodiments, alert display 440 can include any information desired.

In one embodiment, alert screen 440 generated at ALERT THE FIRST USER TO THE SECOND USER'S REVIEW IN THE WEAK AND/OR PRIORITY BUSINESS LISTING CATEGORY OPERATION 423 (FIG. 4A) requires a positive action/acknowledgement such as check box 443 (FIG. 4B) from the user, or third party, before alert screen 440 can be closed or otherwise terminated.

In one embodiment, once the alert and/or notification is generated and sent to the first user at ALERT THE FIRST USER TO THE SECOND USER'S REVIEW IN THE WEAK AND/OR PRIORITY BUSINESS LISTING CATEGORY OPERATION 423, process flow proceeds to END OPERATION 425 and, in one embodiment, process for automatically soliciting business reviews 400 returns to MONITOR SEARCHES OF THE COMMUNITY BASED REVIEW SYSTEM OPERATION 309.

Using process for automatically soliciting business reviews 400, even when the first user conducts a relatively unsuccessful review search of a weak business listing category, the community based business listing and review system application remembers the search and helps the first user by, in essence, continually monitoring the business listing category of the failed or weak and/or priority search for the first user. In this way, a potentially lost customer/user is brought back to the community based business listing and review system application and a stronger sense of community is established.

In some embodiments, the user specific usage data is used to connect two user's in the same community and to solicit a review from a one user who has submitted a review regarding a business in the community on behalf of another user in the same community. In this embodiment, when a first user conducts a review search in a first business listing category, user specific usage data is collected regarding the first user and the search. Then, in this embodiment, a second user in the same community who has submitted a review regarding another business, in another business listing category, is automatically contacted, using the second user's user specific usage data, and a review regarding the first business listing category is solicited from the second user on behalf of the first user.

Figure 5A:
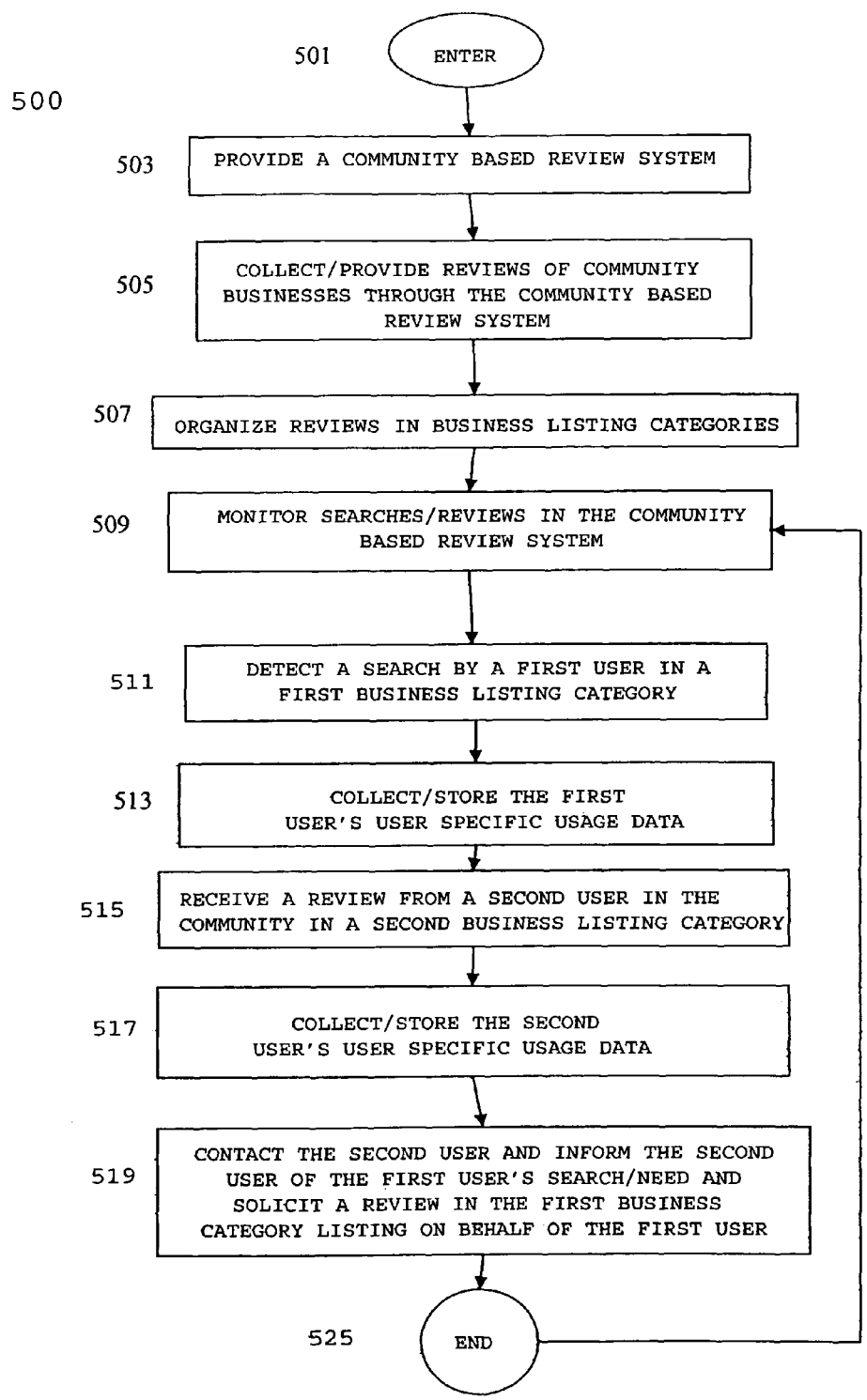
FIG. 5A is a flow chart depicting a process for automatically soliciting business reviews in accordance with one embodiment.

FIG. 5A is a flow chart depicting a process for automatically soliciting business reviews 500 in accordance with one embodiment. Process for automatically soliciting business reviews 500 begins at ENTER OPERATION 501 and process flow proceeds to PROVIDE A COMMUNITY BASED REVIEW SYSTEM OPERATION 503.

PROVIDE A COMMUNITY BASED REVIEW SYSTEM OPERATION 503; COLLECT/PROVIDE REVIEWS OF COMMUNITY BUSINESSES THROUGH THE COMMUNITY BASED REVIEW SYSTEM OPERATION 505; ORGANIZE REVIEWS IN BUSINESS LISTING CATEGORIES OPERATION 507; MONITOR SEARCHES/REVIEWS IN THE COMMUNITY BASED REVIEW SYSTEM OPERATION 509; DETECT A SEARCH BY A FIRST USER IN A FIRST BUSINESS LISTING CATEGORY OPERATION 511; and COLLECT/STORE THE FIRST USER'S USER SPECIFIC USAGE DATA OPERATION 513 of FIG. 5 are substantially identical to PROVIDE A COMMUNITY BASED REVIEW SYSTEM OPERATION 203; COLLECT/PROVIDE REVIEWS OF COMMUNITY BUSINESSES THROUGH THE COMMUNITY BASED REVIEW SYSTEM OPERATION 205; ORGANIZE REVIEWS IN BUSINESS LISTING CATEGORIES OPERATION 207; MONITOR SEARCHES/REVIEWS IN THE COMMUNITY BASED REVIEW SYSTEM OPERATION 209; DETECT A SEARCH BY A FIRST USER IN A FIRST BUSINESS LISTING CATEGORY OPERATION 211; and COLLECT/STORE THE FIRST USER'S USER SPECIFIC USAGE DATA OPERATION 213 discussed above with respect to process for automatically soliciting business reviews 200 of FIG. 2. Consequently, the discussion above with respect to: PROVIDE A COMMUNITY BASED REVIEW SYSTEM OPERATION 203; COLLECT/PROVIDE REVIEWS OF COMMUNITY BUSINESSES THROUGH THE COMMUNITY BASED REVIEW SYSTEM OPERATION 205; ORGANIZE REVIEWS IN BUSINESS LISTING CATEGORIES OPERATION 207; MONITOR SEARCHES/REVIEWS IN THE COMMUNITY BASED REVIEW SYSTEM OPERATION 209; DETECT A SEARCH BY A FIRST USER IN A FIRST BUSINESS LISTING CATEGORY OPERATION 211; and COLLECT/STORE THE FIRST USER'S USER SPECIFIC USAGE DATA OPERATION 213 of process for automatically soliciting business reviews 200 of FIG. 2 is applicable to, and incorporated here for, similarly named and labeled elements of PROVIDE A COMMUNITY BASED REVIEW SYSTEM OPERATION 503; COLLECT/PROVIDE REVIEWS OF COMMUNITY BUSINESSES THROUGH THE COMMUNITY BASED REVIEW SYSTEM OPERATION 505; ORGANIZE REVIEWS IN BUSINESS LISTING CATEGORIES OPERATION 507; MONITOR SEARCHES/REVIEWS IN THE COMMUNITY BASED REVIEW SYSTEM OPERATION 509; DETECT A SEARCH BY A FIRST USER IN A FIRST BUSINESS LISTING CATEGORY OPERATION 511; and COLLECT/STORE THE FIRST USER'S USER SPECIFIC USAGE DATA OPERATION 513 of process for automatically soliciting business reviews 500 of FIG. 5A.

In one embodiment, once the user specific usage data is collected and stored at COLLECT/STORE THE FIRST USER'S USER SPECIFIC USAGE DATA OPERATION 513, process flow proceeds to RECEIVE A REVIEW FROM A SECOND USER IN THE COMMUNITY IN A SECOND BUSINESS LISTING CATEGORY OPERATION 515.

At RECEIVE A REVIEW FROM A SECOND USER IN THE COMMUNITY IN A SECOND BUSINESS LISTING CATEGORY OPERATION 515, a review is submitted and received from a second user in a second business listing category, different from the first category searched by the first user. However, in one embodiment, the second user is either from the same community as the first user, or the second user has submitted a review of a business in the same community as the first user.

In one embodiment, once the review in the second business listing category is submitted and received, process flow proceeds to COLLECT/STORE THE SECOND USER'S USER SPECIFIC USAGE DATA OPERATION 517.

At COLLECT/STORE THE SECOND USER'S USER SPECIFIC USAGE DATA OPERATION 517 the second user's user specific usage data such as: the second user's identification and/or the second user's contact information, such as his or her e-mail address; the business listing category in which the review was submitted; the community in which the second user resides and/or the business being reviewed resides; and any other information about the second user available and desired, is collected and stored by the provider of the community based business listing and review system implementing process for automatically soliciting business reviews 200 and/or the provider of process for automatically soliciting business reviews 200 by any of the means known to those of skill in the art, whether known at the time of filing, or developed thereafter, and/or as discussed above with respect to COLLECT/STORE THE FIRST USER'S USER SPECIFIC USAGE DATA OPERATION 213 of FIG. 2.

Returning to FIG. 5A, once the second user's user specific usage data is collected and stored at COLLECT/STORE THE SECOND USER'S USER SPECIFIC USAGE DATA OPERATION 517, process flow proceeds to CONTACT THE SECOND USER AND INFORM THE SECOND USER OF THE FIRST USER'S SEARCH/NEED AND SOLICIT A REVIEW IN THE FIRST BUSINESS LISTING CATEGORY ON BEHALF OF THE FIRST USER OPERATION 519.

At CONTACT THE SECOND USER AND INFORM THE SECOND USER OF THE FIRST USER'S SEARCH/NEED AND SOLICIT A REVIEW IN THE FIRST BUSINESS LISTING CATEGORY ON BEHALF OF THE FIRST USER OPERATION 519, a review solicitation is generated which specifically asks the second user to submit a review in the first business listing category on the behalf of the first user. In this embodiment, at least three advantages are had. First, the review solicitation is being made to a second user who has already submitted reviews in the second business listing category and has therefore shown a willingness to participate in the process. Second, the review solicitation is being made to the second user based on an actual need of another user in the second user's community, i.e., the first user. Consequently, it is felt the second user is more likely to respond feeling that he or she is directly helping a neighbor rather than, or as well as, the provider of the community based business listing and review system application. Third, using this embodiment, the first user and the second user are often members of the same community and therefore any review submitted by the second user will more likely be directly relevant to the needs of the first user.

FIG. 5B shows one embodiment of a review solicitation screen 540 as it would appear on a display screen 531 of a display device 530, such as display devices 115, 165, 125 of FIG. 1. As shown in FIG. 5B review solicitation screen 540 includes text 541 informing the second user that the first user is looking for a review in the first category, in this example category "X".

In one embodiment, the review solicitation generated and sent at CONTACT THE SECOND USER AND INFORM THE SECOND USER OF THE FIRST USER'S SEARCH/NEED AND SOLICIT A REVIEW IN THE FIRST BUSINESS LISTING CATEGORY ON BEHALF OF THE FIRST USER OPERATION 519 is generated and sent by any of the means, methods, and/or apparatuses well known to those of skill in the art and/or as discussed above with respect to alert display 440 of FIG. 4B and ALERT THE FIRST USER TO THE SECOND USER'S REVIEW IN THE WEAK AND/OR PRIORITY BUSINESS LISTING CATEGORY OPERATION 423 of FIG. 4A. Consequently, the discussion of those elements is incorporated here for review solicitation screen 540 and CONTACT THE SECOND USER AND INFORM THE SECOND USER OF THE FIRST USER'S SEARCH/NEED AND SOLICIT A REVIEW IN THE FIRST BUSINESS LISTING CATEGORY ON BEHALF OF THE FIRST USER OPERATION 519.

Those of skill in the art will readily recognize that the one example of a review solicitation screen 540 shown in FIG. 5B is exemplary only and that the information displayed, and the arrangement of the information displayed, in a review solicitation screen, such as review solicitation screen 540, will vary significantly from process-to-process and user-to-user. In other embodiments, a review solicitation screen, such as review solicitation screen 540 can include any information desired.

In one embodiment, the review solicitation screen 540 generated at CONTACT THE SECOND USER AND INFORM THE SECOND USER OF THE FIRST USER'S SEARCH/NEED AND SOLICIT A REVIEW IN THE FIRST BUSINESS LISTING CATEGORY ON BEHALF OF THE FIRST USER OPERATION 519 (FIG. 5A) requires a positive action/acknowledgement such as check box 543 (FIG. 5B) from the user before review solicitation screen 540 can be closed or otherwise terminated.

In one embodiment, once the review solicitation is generated which specifically asks the second user to submit a review in the first business listing category on the behalf of the first user at CONTACT THE SECOND USER AND INFORM THE SECOND USER OF THE FIRST USER'S SEARCH/NEED AND SOLICIT A REVIEW IN THE FIRST BUSINESS LISTING CATEGORY ON BEHALF OF THE FIRST USER OPERATION 519, process flow proceeds to END OPERATION 525 and, in one embodiment, process for automatically soliciting business reviews 500 returns to MONITOR SEARCHES OF THE COMMUNITY BASED REVIEW SYSTEM OPERATION 509.

Those of skill and the art will readily recognize that the order of operations depicted in the FIG.s are shown for illustrative purposes only and that other orders of operations are possible and within the scope as claimed below. For instance, in other embodiments of process for automatically soliciting business reviews 500, the review submitted from the second user in the community at RECEIVE A REVIEW FROM A SECOND USER IN THE COMMUNITY IN A SECOND BUSINESS LISTING CATEGORY OPERATION 515 can be received prior to the search conducted by the first user in the first category at DETECT A SEARCH BY A FIRST USER IN A FIRST BUSINESS LISTING CATEGORY OPERATION 511. In these embodiments, the second user's user specific usage data is collected at COLLECT/STORE THE SECOND USER'S USER SPECIFIC USAGE DATA OPERATION 517 prior to the first user search of the first category at DETECT A SEARCH BY A FIRST USER IN A FIRST BUSINESS LISTING CATEGORY OPERATION 511. Other than this, the function of process for automatically soliciting business reviews 500 would be substantially the same.

In one embodiment, if the second user responds to the review solicitation made on behalf of the first user, the first user is notified in very much the same manner as the first user was notified in the discussion above with respect to process for automatically soliciting business reviews 200 of FIG. 2.

Figure 6:
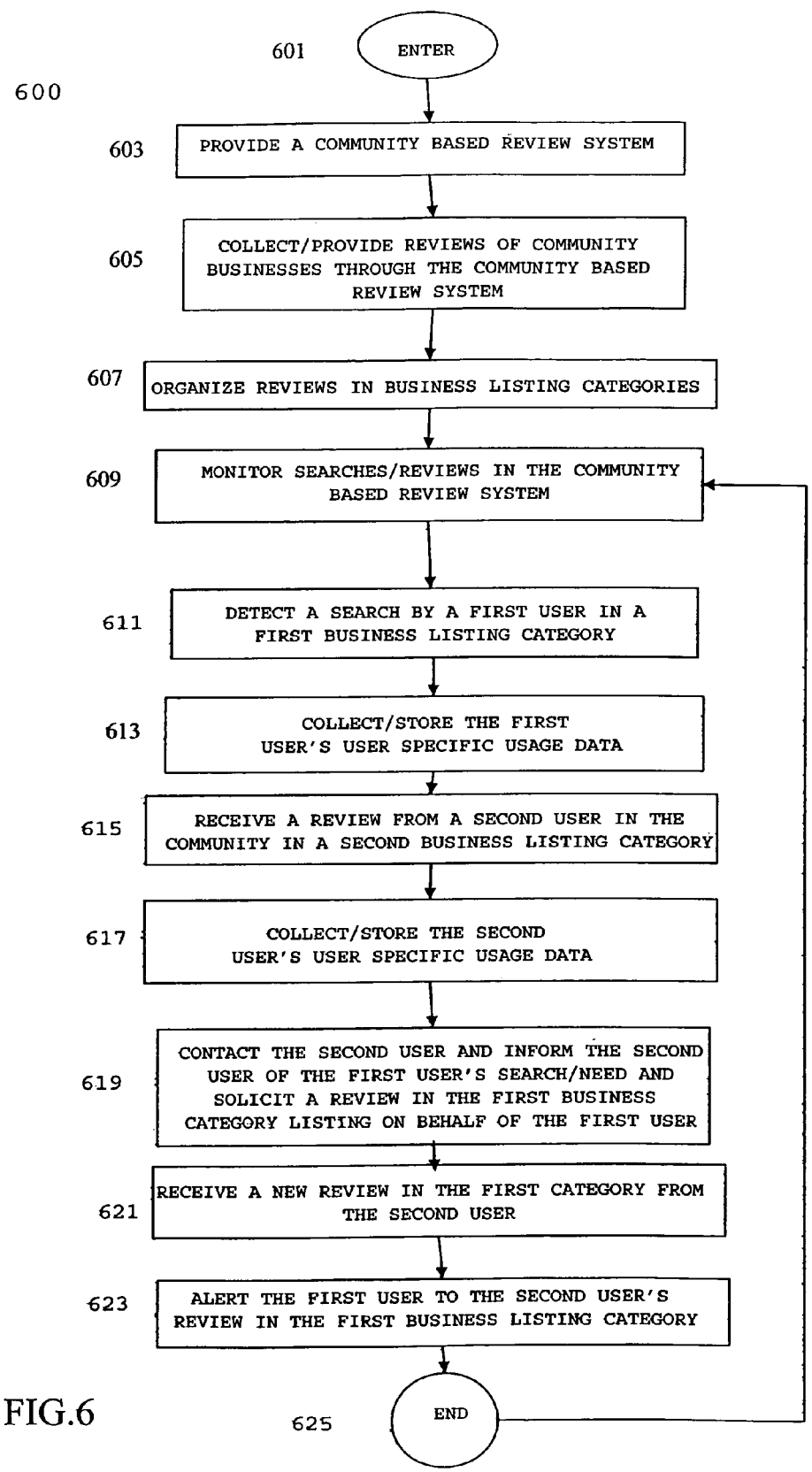
FIG. 6 is a flow chart depicting a process for automatically soliciting business reviews in accordance with one embodiment.

FIG. 6 is a flow chart depicting a process for automatically soliciting business reviews 600 in accordance with one embodiment. Process for automatically soliciting business reviews 600 begins at ENTER OPERATION 601 and process flow proceeds to PROVIDE A COMMUNITY BASED REVIEW SYSTEM OPERATION 603.

Process for automatically soliciting business reviews 600 is very similar to process for automatically soliciting business reviews 500 and, in one embodiment, PROVIDE A COMMUNITY BASED REVIEW SYSTEM OPERATION 503; COLLECT/PROVIDE REVIEWS OF COMMUNITY BUSINESSES THROUGH THE COMMUNITY BASED REVIEW SYSTEM OPERATION 505; ORGANIZE REVIEWS IN BUSINESS LISTING CATEGORIES OPERATION 507; MONITOR SEARCHES/REVIEWS IN THE COMMUNITY BASED REVIEW SYSTEM OPERATION 509; DETECT A SEARCH BY A FIRST USER IN A FIRST BUSINESS LISTING CATEGORY OPERATION 511; COLLECT/STORE THE FIRST USER'S USER SPECIFIC USAGE DATA OPERATION 513; RECEIVE A REVIEW FROM A SECOND USER IN THE COMMUNITY IN A SECOND BUSINESS LISTING CATEGORY OPERATION 515; COLLECT/STORE THE SECOND USER'S USER SPECIFIC USAGE DATA OPERATION 517; CONTACT THE SECOND USER AND INFORM THE SECOND USER OF THE FIRST USER'S SEARCH/NEED AND SOLICIT A REVIEW IN THE FIRST BUSINESS LISTING CATEGORY ON BEHALF OF THE FIRST USER OPERATION 519 are substantially identical to: PROVIDE A COMMUNITY BASED REVIEW SYSTEM OPERATION 603; COLLECT/PROVIDE REVIEWS OF COMMUNITY BUSINESSES THROUGH THE COMMUNITY BASED REVIEW SYSTEM OPERATION 605; ORGANIZE REVIEWS IN BUSINESS LISTING CATEGORIES OPERATION 607; MONITOR SEARCHES/REVIEWS IN THE COMMUNITY BASED REVIEW SYSTEM OPERATION 609; DETECT A SEARCH BY A FIRST USER IN A FIRST BUSINESS LISTING CATEGORY OPERATION 611; COLLECT/STORE THE FIRST USER'S USER SPECIFIC USAGE DATA OPERATION 613; RECEIVE A REVIEW FROM A SECOND USER IN THE COMMUNITY IN A SECOND BUSINESS LISTING CATEGORY OPERATION 615; COLLECT/STORE THE SECOND USER'S USER SPECIFIC USAGE DATA OPERATION 617; CONTACT THE SECOND USER AND INFORM THE SECOND USER OF THE FIRST USER'S SEARCH/NEED AND SOLICIT A REVIEW IN THE FIRST BUSINESS LISTING CATEGORY ON BEHALF OF THE FIRST USER OPERATION 619. Consequently, the entire discussion above with respect to process for automatically soliciting business reviews 500 is incorporated here for similarly named and labeled elements of process for automatically soliciting business reviews 600.

In addition to the substantially identical elements of process for automatically soliciting business reviews 500, process for automatically soliciting business reviews 600 includes RECEIVE A NEW REVIEW IN THE FIRST CATEGORY FROM THE SECOND USER OPERATION 621 and ALERT THE FIRST USER TO THE SECOND USER'S REVIEW IN THE FIRST BUSINESS LISTING CATEGORY OPERATION 623.

At RECEIVE A NEW REVIEW IN THE FIRST CATEGORY FROM THE SECOND USER OPERATION 621 a review is submitted and received from the second user in the first category in response to the review solicitation on the first user's behalf at CONTACT THE SECOND USER AND INFORM THE SECOND USER OF THE FIRST USER'S SEARCH/NEED AND SOLICIT A REVIEW IN THE FIRST BUSINESS LISTING CATEGORY ON BEHALF OF THE FIRST USER OPERATION 619.

In one embodiment, once review is submitted and received from the second user in the first category in response to the review solicitation, process flow proceeds to ALERT THE FIRST USER TO THE SECOND USER'S REVIEW IN THE FIRST BUSINESS LISTING CATEGORY OPERATION 623.

At ALERT THE FIRST USER TO THE SECOND USER'S REVIEW IN THE FIRST BUSINESS LISTING CATEGORY OPERATION 623 an alert and/or notification, such as alert display 440 of FIG. 4B, is generated and sent to the first user by any of the means, methods, or structures discussed above with respect to ALERT THE FIRST USER TO THE SECOND USER'S REVIEW IN THE WEAK AND/OR PRIORITY BUSINESS LISTING CATEGORY OPERATION 423 of FIG. 4A and alert display 440 of FIG. 4B.

Returning to FIG. 6, in one embodiment, once an alert and/or notification is sent to the first user at ALERT THE FIRST USER TO THE SECOND USER'S REVIEW IN THE FIRST BUSINESS LISTING CATEGORY OPERATION 623, process flow proceeds to END OPERATION 625 and process for automatically soliciting business reviews 600 returns to MONITOR SEARCHES/REVIEWS IN THE COMMUNITY BASED REVIEW SYSTEM OPERATION 609.

In one embodiment, the user specific usage data is used to solicit a review from a user who has conducted a review search in a given business listing category automatically after a predefined period of time has elapsed. In this embodiment, when a first user conducts a search for reviews in a selected business listing category having either relatively few, or no, reviews, or a business listing category that is deemed a priority business listing category by the provider of the community based business listings and review service employing the process for automatically soliciting business reviews, the user specific usage data is collected including data indicating the business listing category searched and the user's contact information. Then after a predetermined period of time, if no review has been submitted by the first user, the first user is automatically contacted and a review is solicited regarding the specific business listing category in which the search was previously made.

Figure 7:
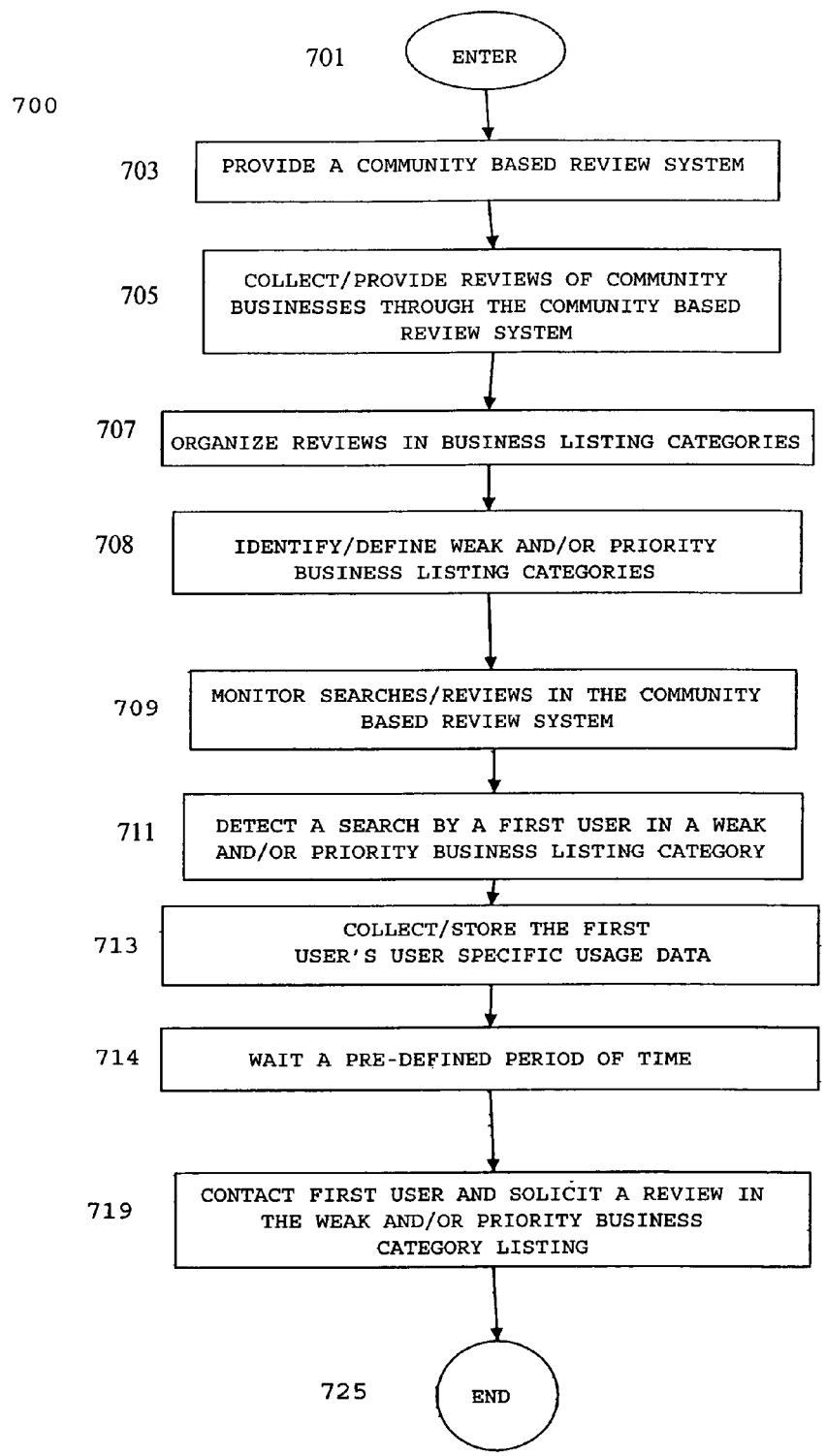
FIG. 7 is a flow chart depicting a process for automatically soliciting business reviews in accordance with one embodiment.

FIG. 7 is a flow chart depicting a process for automatically soliciting business reviews 700 in accordance with one embodiment. Process for automatically soliciting business reviews 700 begins at ENTER OPERATION 701 and process flow proceeds to PROVIDE A COMMUNITY BASED REVIEW SYSTEM OPERATION 703.

PROVIDE A COMMUNITY BASED REVIEW SYSTEM OPERATION 703; COLLECT/PROVIDE REVIEWS OF COMMUNITY BUSINESSES THROUGH THE COMMUNITY BASED REVIEW SYSTEM OPERATION 705; ORGANIZE REVIEWS IN BUSINESS LISTING CATEGORIES OPERATION 707; IDENTIFY/DEFINE WEAK AND/OR PRIORITY BUSINESS LISTING CATEGORIES OPERATION 708; MONITOR SEARCHES/REVIEWS IN THE COMMUNITY BASED REVIEW SYSTEM OPERATION 709; DETECT A SEARCH BY A FIRST USER IN A WEAK AND/OR PRIORITY BUSINESS LISTING CATEGORY OPERATION 711; and COLLECT/STORE THE FIRST USER'S USER SPECIFIC USAGE DATA OPERATION 713 of process for automatically soliciting business reviews 700 are substantially identical to: PROVIDE A COMMUNITY BASED REVIEW SYSTEM OPERATION 403; COLLECT/PROVIDE REVIEWS OF COMMUNITY; BUSINESSES THROUGH THE COMMUNITY BASED REVIEW SYSTEM OPERATION 405; ORGANIZE REVIEWS IN BUSINESS LISTING CATEGORIES OPERATION 407; IDENTIFY/DEFINE WEAK AND/OR PRIORITY BUSINESS LISTING CATEGORIES OPERATION 408; MONITOR SEARCHES/REVIEWS IN THE COMMUNITY BASED REVIEW SYSTEM OPERATION 409; DETECT A SEARCH BY A FIRST USER IN A WEAK AND/OR PRIORITY BUSINESS LISTING CATEGORY OPERATION 411; and COLLECT/STORE THE FIRST USER'S USER SPECIFIC USAGE DATA OPERATION 413 of process for automatically soliciting business reviews 400 of FIG. 4A. Consequently, the discussion above with respect to: PROVIDE A COMMUNITY BASED REVIEW SYSTEM OPERATION 403; COLLECT/PROVIDE REVIEWS OF COMMUNITY; BUSINESSES THROUGH THE COMMUNITY BASED REVIEW SYSTEM OPERATION 405; ORGANIZE REVIEWS IN BUSINESS LISTING CATEGORIES OPERATION 407; IDENTIFY/DEFINE WEAK AND/OR PRIORITY BUSINESS LISTING CATEGORIES OPERATION 408; MONITOR SEARCHES/REVIEWS IN THE COMMUNITY BASED REVIEW SYSTEM OPERATION 409; DETECT A SEARCH BY A FIRST USER IN A WEAK AND/OR PRIORITY BUSINESS LISTING CATEGORY OPERATION 411; and COLLECT/STORE THE FIRST USER'S USER SPECIFIC USAGE DATA OPERATION 413 of process for automatically soliciting business reviews 400 of FIG. 4A applies to, and is incorporated here for: PROVIDE A COMMUNITY BASED REVIEW SYSTEM OPERATION 703; COLLECT/PROVIDE REVIEWS OF COMMUNITY BUSINESSES THROUGH THE COMMUNITY BASED REVIEW SYSTEM OPERATION 705; ORGANIZE REVIEWS IN BUSINESS LISTING CATEGORIES OPERATION 707; IDENTIFY/DEFINE WEAK AND/OR PRIORITY BUSINESS LISTING CATEGORIES OPERATION 708; MONITOR SEARCHES/REVIEWS IN THE COMMUNITY BASED REVIEW SYSTEM OPERATION 709; DETECT A SEARCH BY A FIRST USER IN A WEAK AND/OR PRIORITY BUSINESS LISTING CATEGORY OPERATION 711; and COLLECT/STORE THE FIRST USER'S USER SPECIFIC USAGE DATA OPERATION 713 of process for automatically soliciting business reviews 700 of FIG. 7.

In one embodiment, once the user specific usage data is collected and stored at COLLECT/STORE THE FIRST USER'S USER SPECIFIC USAGE DATA OPERATION 413, process flow proceeds to WAIT A PRE-DEFINED PERIOD OF TIME OPERATION 714.

At WAIT A PRE-DEFINED PERIOD OF TIME OPERATION 714 a pre-defined period of time is allowed to lapse in order to allow the first user to: find/choose a business in the weak and/or priority business listing category searched at DETECT A SEARCH BY A FIRST USER IN A WEAK AND/OR PRIORITY BUSINESS LISTING CATEGORY OPERATION 711; make a purchase from, or obtain a service from, the chosen business; and submit a review of the chosen business in the weak and/or priority business listing category. Obviously, the pre-defined period of time will vary significantly from business listing category-to-business listing category. For instance, one would expect that the period of time waited would be significantly greater for the business category "Real Estate" or "Attorney" than for a business category such as "Auto Repair" or "Super Market".

In one embodiment, once the pre-defined period of time is allowed to lapse at WAIT A PRE-DEFINED PERIOD OF TIME OPERATION 714. process flow proceeds to CONTACT FIRST USER AND SOLICIT A REVIEW IN THE WEAK AND/OR PRIORITY BUSINESS LISTING CATEGORY OPERATION 719.

At CONTACT FIRST USER AND SOLICIT A REVIEW IN THE WEAK AND/OR PRIORITY BUSINESS LISTING CATEGORY OPERATION 719, a customized review solicitation is sent to the first user using the first user's user specific usage data from COLLECT/STORE THE FIRST USER'S USER SPECIFIC USAGE DATA OPERATION 713 and a review is solicited for the first business category.

In one embodiment, once the customized review solicitation is sent to the first user at CONTACT FIRST USER AND SOLICIT A REVIEW IN THE WEAK AND/OR PRIORITY BUSINESS LISTING CATEGORY OPERATION 719, process flow proceeds to END OPERATION 725 and process for automatically soliciting business reviews 700 returns to MONITOR SEARCHES/REVIEWS IN THE COMMUNITY BASED REVIEW SYSTEM OPERATION 709

Process for automatically soliciting business reviews 700 solicits reviews from the first user based on the theory that if the first user was conducting a review search, it is likely that the first user did indeed conduct business with a local merchant in the business listing category. Consequently, process for automatically soliciting business reviews waits a reasonable amount of time and then contacts the first user to solicit a review of the business he or she chose to use.

In other embodiments, the first user is contacted on behalf of a second user in a manner very similar to that discussed with respect to process for automatically soliciting business reviews 500 of FIG. 5.

Figure 8:
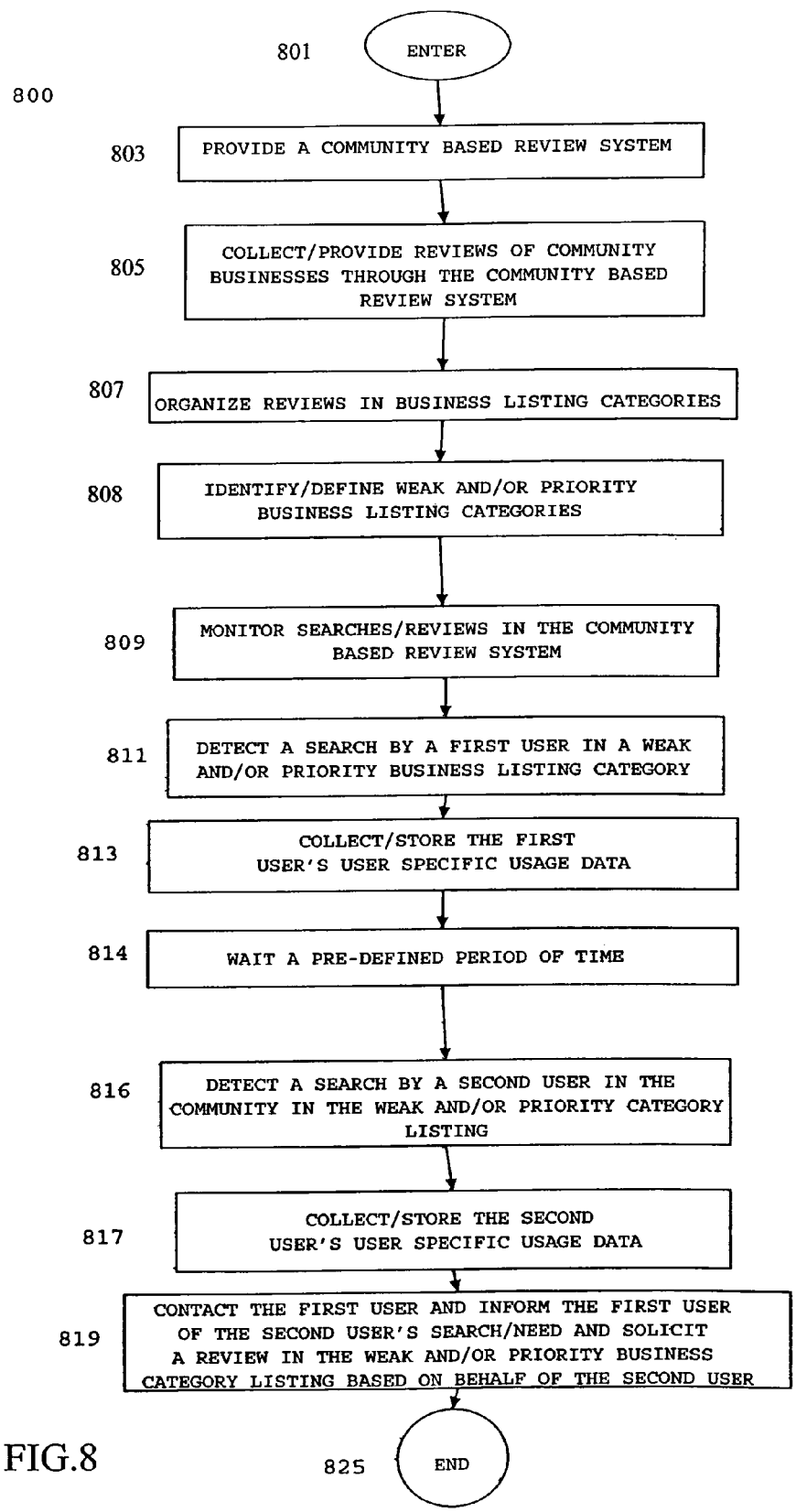
FIG. 8 is a flow chart depicting a process for automatically soliciting business reviews in accordance with one embodiment.

FIG. 8 is a flow chart depicting a process for automatically soliciting business reviews 800 in accordance with one embodiment. Process for automatically soliciting business reviews 800 begins at ENTER OPERATION 801.

In one embodiment, process for automatically soliciting business reviews 800 is very similar to Process for automatically soliciting business reviews 700 of FIG. 7. Consequently, the entire discussion above with respect to PROVIDE A COMMUNITY BASED REVIEW SYSTEM OPERATION 703; COLLECT/PROVIDE REVIEWS OF COMMUNITY BUSINESSES THROUGH THE COMMUNITY BASED REVIEW SYSTEM OPERATION 705; ORGANIZE REVIEWS IN BUSINESS LISTING CATEGORIES OPERATION 707; IDENTIFY/DEFINE WEAK AND/OR PRIORITY BUSINESS LISTING CATEGORIES OPERATION 708; MONITOR SEARCHES/REVIEWS IN THE COMMUNITY BASED REVIEW SYSTEM OPERATION 709; DETECT A SEARCH BY A FIRST USER IN A WEAK AND/OR PRIORITY BUSINESS LISTING CATEGORY OPERATION 711; COLLECT/STORE THE FIRST USER'S USER SPECIFIC USAGE DATA OPERATION 713; and WAIT A PRE-DEFINED PERIOD OF TIME OPERATION 714 of process for automatically soliciting business reviews 700 of FIG. 7 applies to and is incorporated here for: PROVIDE A COMMUNITY BASED REVIEW SYSTEM OPERATION 803; COLLECT/PROVIDE REVIEWS OF COMMUNITY BUSINESSES THROUGH THE COMMUNITY BASED REVIEW SYSTEM OPERATION 805; ORGANIZE REVIEWS IN BUSINESS LISTING CATEGORIES OPERATION 807; IDENTIFY/DEFINE WEAK AND/OR PRIORITY BUSINESS LISTING CATEGORIES OPERATION 808; MONITOR SEARCHES/REVIEWS IN THE COMMUNITY BASED REVIEW SYSTEM OPERATION 809; DETECT A SEARCH BY A FIRST USER IN A WEAK AND/OR PRIORITY BUSINESS LISTING CATEGORY OPERATION 811; COLLECT/STORE THE FIRST USER'S USER SPECIFIC USAGE DATA OPERATION 813; and WAIT A PREDEFINED PERIOD OF TIME OPERATION 814 of process for automatically soliciting business reviews 800 of FIG. 8.

In addition, process for automatically soliciting business reviews 800 includes DETECT A SEARCH BY A SECOND USER IN THE COMMUNITY IN THE WEAK AND/OR PRIORITY CATEGORY LISTING OPERATION 816, COLLECT/STORE THE SECOND USER'S USER SPECIFIC USAGE DATA OPERATION 817, and CONTACT THE FIRST USER AND INFORM THE FIRST USER OF THE SECOND USER'S SEARCH/NEED AND SOLICIT A REVIEW IN THE WEAK AND/OR PRIORITY BUSINESS LISTING CATEGORY BASED ON BEHALF OF THE SECOND USER OPERATION 819 whereby the review solicitation to the first user is made at CONTACT THE FIRST USER AND INFORM THE FIRST USER OF THE SECOND USER'S SEARCH/NEED AND SOLICIT A REVIEW IN THE WEAK AND/OR PRIORITY BUSINESS LISTING CATEGORY BASED ON BEHALF OF THE SECOND USER OPERATION 819 in response to a search by a second user, and on behalf of the second user, by any of the means, processes, or structures discussed herein.

At CONTACT THE FIRST USER AND INFORM THE FIRST USER OF THE SECOND USER'S SEARCH/NEED AND SOLICIT A REVIEW IN THE WEAK AND/OR PRIORITY BUSINESS LISTING CATEGORY BASED ON BEHALF OF THE SECOND USER OPERATION 819, a review solicitation is generated similar to review solicitation screen 540 of FIG. 5B, which specifically asks the first user to submit a review in the weak and/or priority business listing category on the behalf of the second user. In the embodiment of FIG. 8, The review solicitation is being made to the first user based on an actual need of another user in the first user's community, i.e., the second user. Consequently, it is felt the first user is more likely to respond feeling that he or she is directly helping a neighbor rather than, or as well as, the provider of the community based business listing and review system application. In addition, using this embodiment, the first user and the second user are often members of the same community and therefore any review submitted by the first user will more likely be directly relevant to the needs of the second user.

Using the method and apparatus for automatically soliciting business reviews, and a process for automatically soliciting business reviews, disclosed herein, review solicitations are made in an efficient and customized manner that is beneficial to both the provider of the community based business listing and review system and the user. In addition, the solicitations generated using the method and apparatus for automatically soliciting business reviews, and a process for automatically soliciting business reviews, disclosed herein are also more likely to yield results because they are based on a user's actual usage and information. In addition, in one embodiment, the review solicitations are made on behalf of another user in the community. Therefore, the user being solicited is more likely to respond knowing that another user, like themselves, is the beneficiary. Consequently, community based business listing and review systems employing a process for automatically soliciting business reviews disclosed herein is likely to receive more reviews, more relevant reviews, and a more loyal user base than current community based business listing and review system applications that generate blanket and/or generic, review requests.

In addition, as discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components and/or operations described herein is merely exemplary, and not mandatory or significant. Consequently, functions performed by a single component and/or operation may, in other embodiments, be performed by multiple components and/or operations, and functions performed by multiple components and/or operations may, in other embodiments, be performed by a single component and/or operation.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "collecting", "providing", "organizing", "storing", "monitoring", "comparing", "contacting", "defining", "detecting", "alerting", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for process or application for automatically soliciting business reviews, discussed herein, are identified using a particular nomenclature for ease of description and understanding, but other nomenclature is often used in the art to identify equivalent operations.

In addition, the order of operations depicted in the FIG.s and discussed above was chosen for merely illustrative purposes. Those of skill in the art will readily recognize that different orders of operations can be implemented without departing from the scope of the invention as claimed below.

Therefore, numerous variations, whether explicitly provided for by the specification or implied by the specification or not, may be implemented by one of skill in the art in view of this disclosure.

What is claimed is:

1. A computer-implemented method for automatically soliciting business reviews comprising:
a process for automatically soliciting business reviews using a community based business listing and review system executed at least in part by a processor, the process comprising:
obtaining, by the processor, business reviews through the community based business listing and review system;
organizing, by the processor, the business reviews by community and by business listing category;
detecting, by the processor, a review search by a first user in a first business listing category, the first business listing category having been previously deemed a priority business listing category by the provider of the community based business listings and review service in response to the first business listing category having less than a threshold number of reviews, the reviews counting towards the threshold being only those reviews submitted subsequent to a predefined amount of time ago, the first business listing category being continually monitored for additional reviews due to the priority designation of the first business listing category; and
responsive to the review search by the first user, and after a period of time has passed since the review search by the first user, the period of time varying based on the particular business listing category searched by the first user, automatically creating and sending one or more first user specific review solicitations to the first user, the first user specific review solicitations being specifically targeted at the first user based on first user specific usage data and user-defined parameters, the first user specific usage data including first user identification and contact information, the first business listing category searched by the first user, a community in which the first user resides, and a location of a business associated with the first user specific review solicitation.

2. The computer-implemented method of claim 1, wherein the process for automatically soliciting business reviews further comprises:
waiting a pre-defined period of time between detecting a review search by a first user in a first business listing category and automatically creating and sending one or more first user specific review solicitations to the first user.

3. The computer-implemented method of claim 1, wherein the process for automatically soliciting business reviews further comprises:
subsequent to automatically creating and sending one or more first user specific review solicitations to the first user, obtaining a business review from the first user.

4. A computer program product for automatically soliciting business reviews comprising:
A non-transitory computer readable medium encoded with computer instructions, when executed by a processor to perform:
providing a community based business listing and review system;
obtaining business reviews through the community based business listing and review system;
organizing the business reviews by community and by business listing category;
detecting a review search by a first user in a first business listing category, the first business listing category having been previously deemed a priority business listing category by the provider of the community based business listings and review service in response to the first business listing category having less than a threshold number of reviews, the reviews counting towards the threshold being only those reviews submitted subsequent to a predefined amount of time ago, the first business listing category being continually monitored for additional reviews due to the priority designation of the first business listing category; and
responsive to the review search by the first user, and after a period of time has passed since the review search by the first user, the period of time varying based on the particular business listing category searched by the first user, automatically creating and sending one or more first user specific review solicitations to the first user, the first user specific review solicitations being specifically targeted at the first user based on first user specific usage data and user-defined parameters, the first user specific usage data including first user identification and contact information, the first business listing category searched by the first user, a community in which the first user resides, and a location of a business associated with the first user specific review solicitation.

* * * * *